US011227522B2

(12) United States Patent
Duarte et al.

(10) Patent No.: US 11,227,522 B2
(45) Date of Patent: Jan. 18, 2022

(54) PULSED ELECTROCHROMIC CONTROL FOR A PANEL AND METHOD OF USE

(71) Applicant: PPG Industries Ohio, Inc., Cleveland, OH (US)

(72) Inventors: Nicolas B. Duarte, Allison Park, PA (US); Kevin Mark Valdisera, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 818 days.

(21) Appl. No.: 15/791,933

(22) Filed: Oct. 24, 2017

(65) Prior Publication Data

US 2019/0122598 A1    Apr. 25, 2019

(51) Int. Cl.
| | |
|---|---|
| *G09G 3/19* | (2006.01) |
| *B60J 3/04* | (2006.01) |
| *E06B 9/24* | (2006.01) |
| *G02F 1/163* | (2006.01) |
| *G09G 3/38* | (2006.01) |
| G09G 3/20 | (2006.01) |
| G02F 1/1503 | (2019.01) |

(52) U.S. Cl.
CPC .................. *G09G 3/19* (2013.01); *B60J 3/04* (2013.01); *E06B 9/24* (2013.01); *G02F 1/163* (2013.01); *G09G 3/38* (2013.01); *G02F 1/1503* (2019.01); *G09G 3/2018* (2013.01); *G09G 2320/0252* (2013.01)

(58) Field of Classification Search
CPC ........... G09G 3/37; G09G 3/2018; G09G 3/38
See application file for complete search history.

(56) References Cited

U.S. PATENT DOCUMENTS

| | | | | |
|---|---|---|---|---|
| 4,246,579 A | * | 1/1981 | Wiesner | G02F 1/163 345/49 |
| 4,349,818 A | * | 9/1982 | Kaneko | G09G 3/19 345/105 |
| 5,066,111 A | | 11/1991 | Singleton et al. | |
| 6,033,592 A | | 3/2000 | Chandrasekhar | |

(Continued)

FOREIGN PATENT DOCUMENTS

WO    2007146862 A2    12/2007

*Primary Examiner* — Christopher Stanford
*Assistant Examiner* — Journey F Sumlar
(74) *Attorney, Agent, or Firm* — Neil J. Friedrich

(57) ABSTRACT

A system for controlling light transmittance includes a panel which is capable of at least one of darkening and lightening in response to applied electric voltage and/or current. The panel includes at least one substrate, an electrically conductive coating on at least a portion of a surface of the at least one substrate forming at least one electrode, and an electrochromic medium covering portions of the at least one substrate and the at least one electrode and in electrical communication with the electrode. The system further includes a power supply in electrical communication with the at least one electrode and a controller in communication with the power supply configured to cause the power supply to apply a voltage and/or current to the at least one electrode according to a predetermined pattern for controlling the transmittance of the panel. The predetermined pattern comprises a plurality of micro-pulses which are less than or equal to 0.5 second in duration.

20 Claims, 16 Drawing Sheets

(56) References Cited

U.S. PATENT DOCUMENTS

| | | | |
|---|---|---|---|
| 6,222,177 B1 | 4/2001 | Bechtel et al. | |
| 7,248,392 B2 | 7/2007 | Rukavina et al. | |
| 7,586,664 B2 | 9/2009 | O'Shaughnessy | |
| 7,990,603 B2 | 8/2011 | Ash et al. | |
| 8,864,321 B2 | 10/2014 | Mehtani et al. | |
| 9,897,885 B2* | 2/2018 | Huang | G06F 1/1637 |
| 2007/0229933 A1 | 10/2007 | Yamaguchi | |
| 2010/0134865 A1* | 6/2010 | Higuchi | G09G 3/38 |
| | | | 359/273 |
| 2010/0277787 A1* | 11/2010 | Fukuoka | G09G 3/38 |
| | | | 359/267 |
| 2015/0098121 A1* | 4/2015 | Turnbull | G02F 1/163 |
| | | | 359/275 |

* cited by examiner

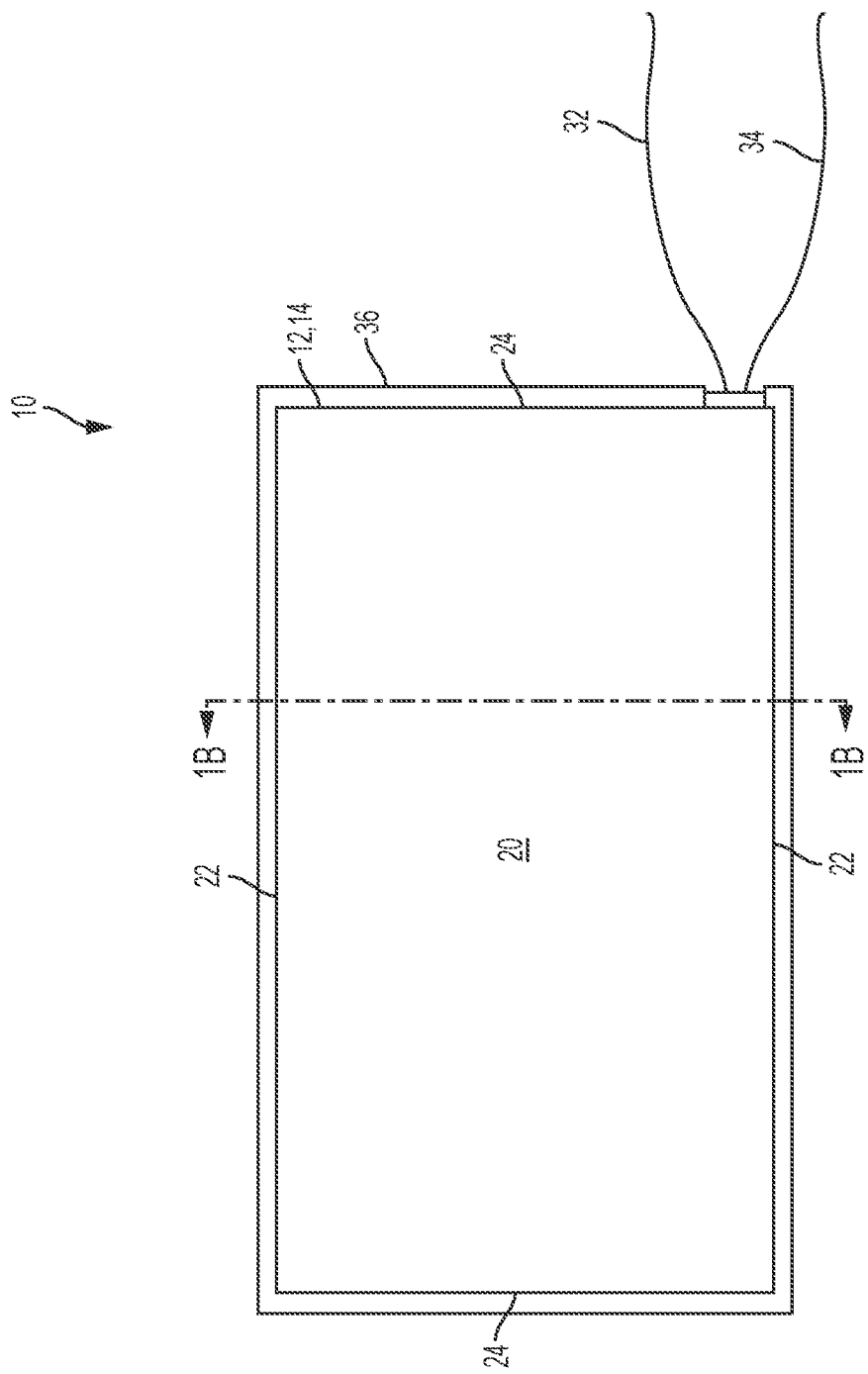

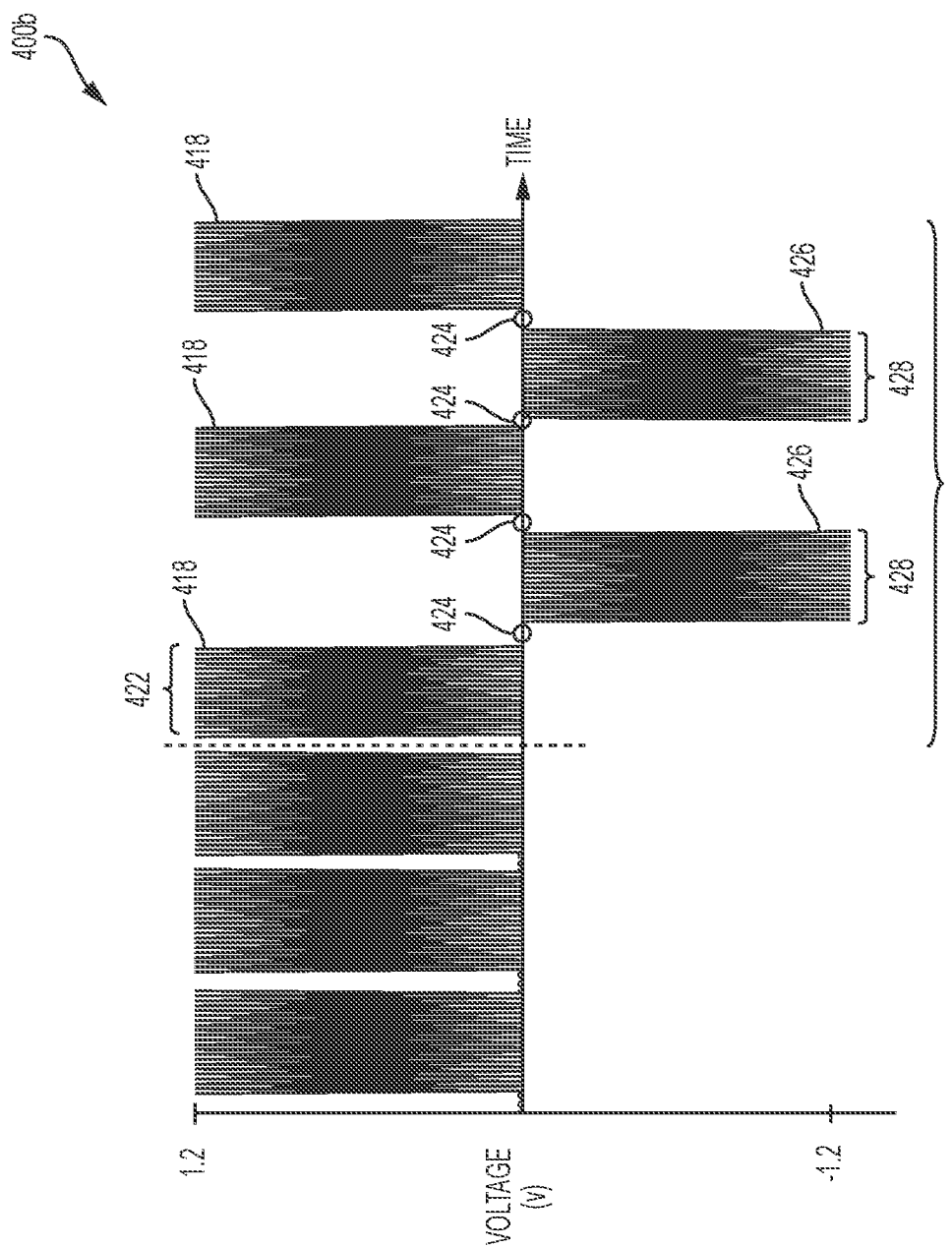

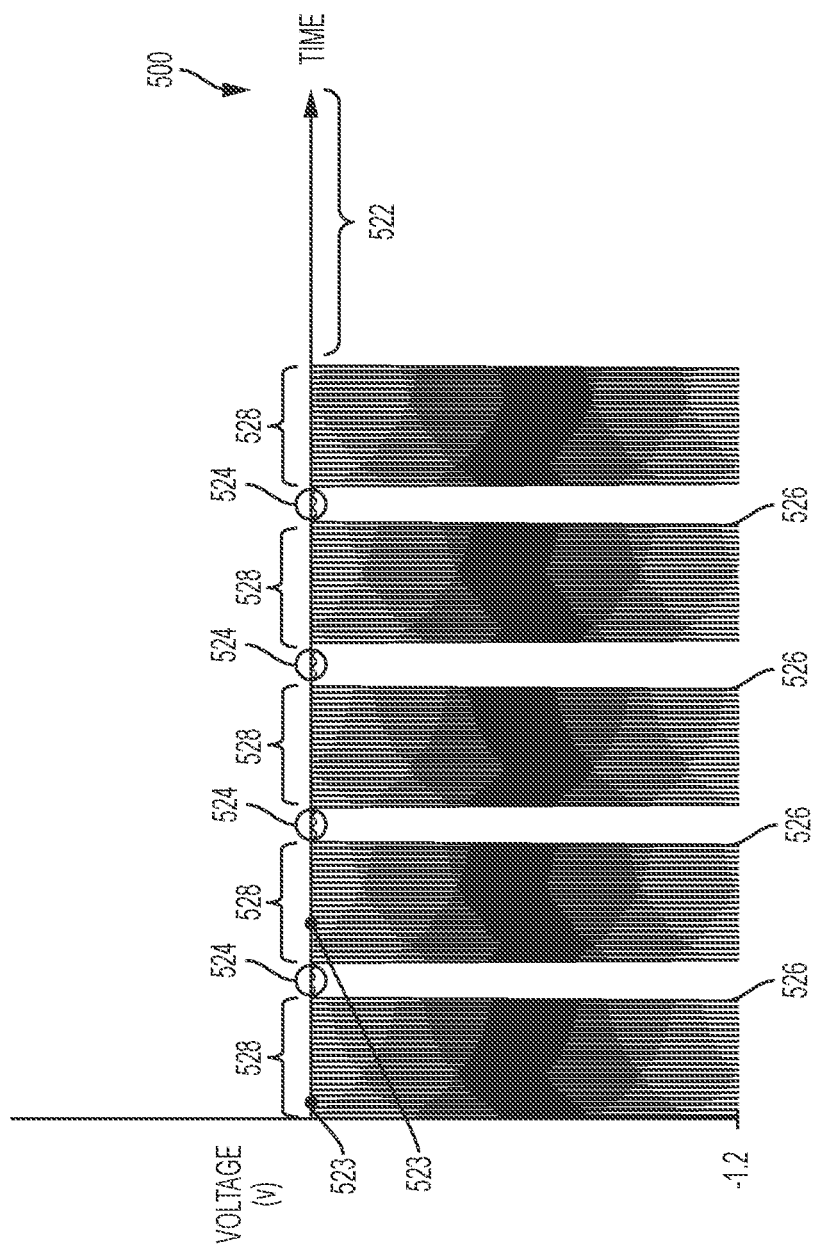

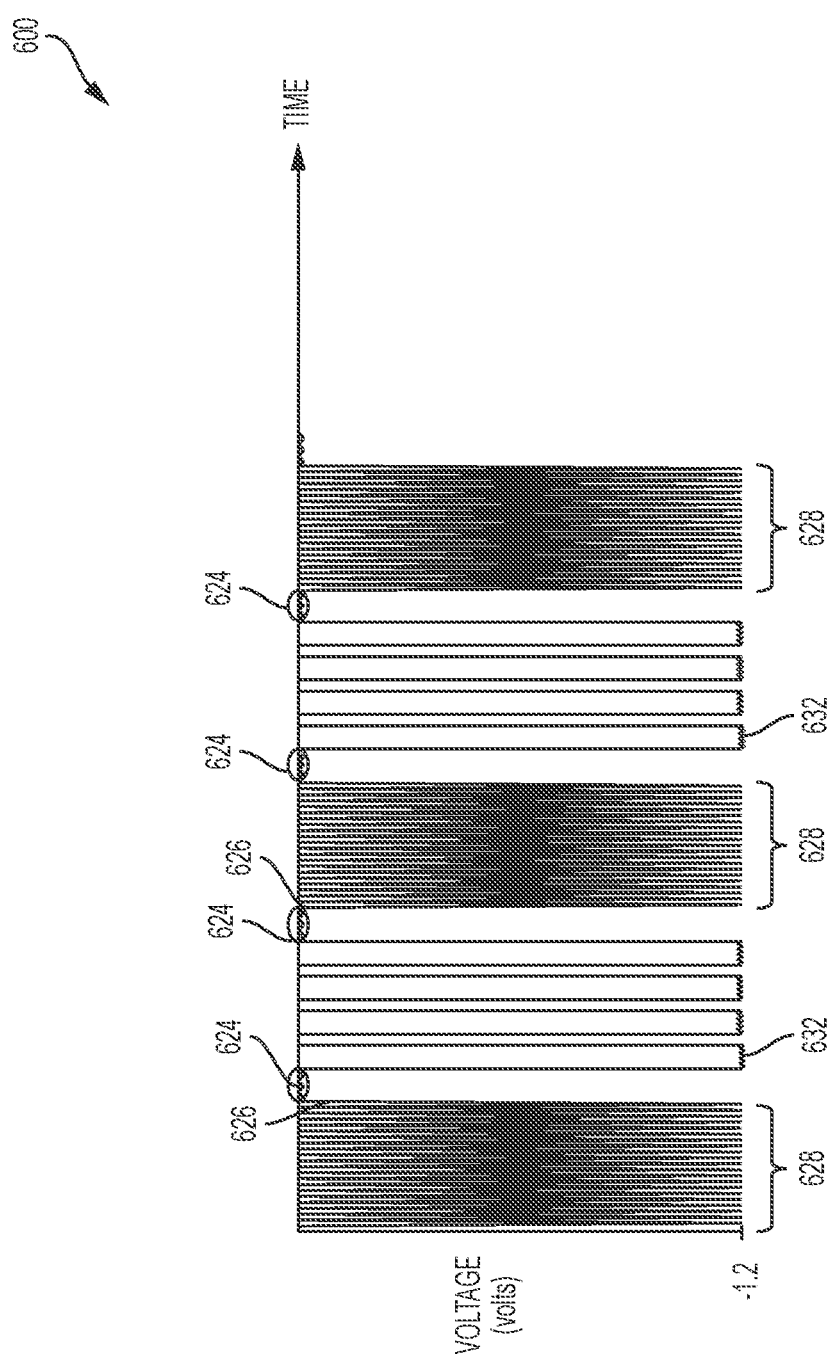

PULSED ELECTROCHROMIC CONTROL FOR A PANEL AND METHOD OF USE

FIELD OF THE INVENTION

This disclosure relates to systems, methods and computer-readable media comprising program instructions for controlling electrochromic panels, which lighten and darken in response to applied electric current and/or voltage.

BACKGROUND OF THE INVENTION

Electrochromic panels, which are capable of lightening and darkening and/or of transitioning between a darkened state and a lightened state when exposed to electric current and/or voltage, are used for vehicle windows, rear-view mirrors, building windows, and similar applications. Exemplary panels can include, for example, opposing glass substrates coated with a conductive film to form an anode and a cathode and an electrochromic film, such as a tungsten oxide film, spaced between the anode and the cathode.

Electrochromic window systems generally include a signal driver or power supply for applying the current and/or voltage to the panel to cause lightening or darkening of the panel. In general, applying current and/or voltage in a first polarity (e.g., a positive voltage) causes the panel to darken. Applying current and/or voltage in a second polarity (e.g., a negative voltage) causes the panel to lighten.

SUMMARY OF THE INVENTION

The invention includes a system for controlling light transmittance, comprising a panel which is capable of at least one of darkening and lightening in response to applied electric voltage and/or current. The panel includes at least one substrate, an electrically conductive coating on at least a portion of a surface of the at least one substrate forming at least one electrode, and an electrochromic medium covering portions of the at least one substrate and the at least one electrode and in electrical communication with the electrode. The system further includes a power supply in electrical communication with the at least one electrode and electronic circuitry electrically connected to the power supply configured to cause the power supply to apply a voltage and/or current to the at least one electrode according to a predetermined pattern for controlling the transmittance of the panel. The predetermined pattern comprises a plurality of micro-pulses which are less than or equal to 0.5 second in duration.

The invention also includes a non-transitory computer-readable medium for directing delivery of electric current and/or voltage from a power supply to an electrochromic panel for controlling light transmittance of the panel. The medium comprises program instructions that, when executed by at least one controller in communication with the power supply, cause the at least one controller to: generate and communicate a first signal to the power supply to cause the power supply to apply a voltage and/or current to the panel to cause the panel to maintain a selected transmittance level; and upon receipt of an instruction to commence lightening of the panel, generate and communicate a second signal to the power supply to cause the power supply to apply a voltage and/or current to the panel according to a predetermined pattern to cause the panel to lighten. The predetermined pattern comprises a plurality of micro-pulses which are less than or equal to 0.5 second in duration.

The present invention also includes a method for controlling transmittance of an electrochromic panel which is capable of lightening and darkening in response to an applied voltage and/or current. The panel comprises at least one substrate, an electrically conductive coating on at least a portion of a surface of the at least one substrate forming at least one electrode, and an electrochromic medium covering portions of the at least one substrate and the at least one electrode and in electrical communication with the electrode. The method further comprises applying a voltage and/or current to the at least one electrode to cause the panel to maintain the selected transmittance level and applying a voltage and/or current to the at least one electrode according to a predetermined pattern to cause the panel to lighten. The predetermined pattern comprises a plurality of micro-pulses which are less than or equal to 0.5 second in duration.

BRIEF DESCRIPTION OF THE DRAWINGS

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limit of the invention.

Further features and other examples and advantages will become apparent from the following detailed description made with reference to the drawings in which:

FIG. 1A is a top plan view of an electrochromic panel according to an embodiment of the present disclosure;

FIG. 4B is a graph illustrating a voltage profile including a pattern of positive voltage and negative voltage micro-pulses for causing an electrochromic panel to darken according to an embodiment of the disclosure;

FIG. 5A is a graph illustrating a voltage profile for lightening or bleaching an electrochromic panel according to an embodiment of the disclosure;

FIG. 6 is a graph of another voltage profile for lightening or bleaching an electrochromic panel including both short and long negative voltage pulses according to an embodiment of the disclosure;

DETAILED DESCRIPTION OF THE INVENTION

Figure 1B:
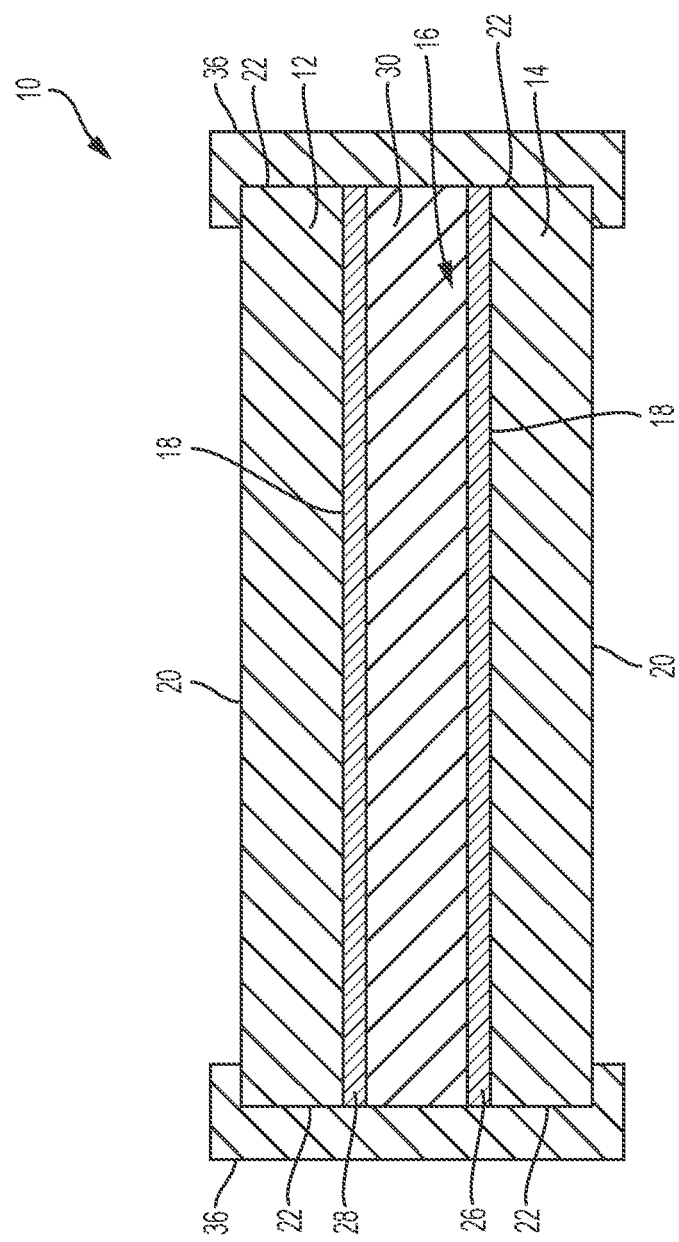
FIG. 1B is a cross-sectional view of the panel of FIG. 1A taken along line 1B-1B.

For purposes of the following detailed description, it is to be understood that the invention may assume various alternative variations and step sequences, except where expressly specified to the contrary. Moreover, other than in any operating examples, or where otherwise indicated, all numbers expressing, for example, a duration of an electric pulse or of a pause between pulses, as used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

As used herein, the singular form of "a", "an", and "the" include plural referents unless the context clearly dictates otherwise.

As used herein, the terms "right", "left", "top", "bottom", and derivatives thereof shall relate to the invention as it is oriented in the drawing figures. However, it is to be understood that the invention can assume various alternative orientations and, accordingly, such terms are not to be considered as limiting. Also, it is to be understood that the invention can assume various alternative variations and stage sequences, except where expressly specified to the contrary. It is also to be understood that the specific devices and processes illustrated in the attached drawings, and described in the following specification, are examples. Hence, specific dimensions and other physical characteristics related to the embodiments disclosed herein are not to be considered as limiting.

As used herein, the terms "communication" and "communicate" refer to the receipt or transfer of one or more signals, messages, commands, or other type of data. "Electrical communication" refers to receipt or transfer of power (e.g., current and/or voltage) between devices. For one unit or component to be in communication with another unit or component means that the one unit or component is able to directly or indirectly receive data or power from and/or transmit data or power to the other unit or component. This can refer to a direct or indirect connection that can be wired and/or wireless in nature. Additionally, two units or components can be in communication with each other even though the data transmitted can be modified, processed, routed, and the like, between the first and second unit or component. For example, a first unit can be in communication with a second unit even though the first unit passively receives data, and does not actively transmit data to the second unit. As another example, a first unit can be in communication with a second unit if an intermediary unit processes data from one unit and transmits processed data to the second unit. It will be appreciated that numerous other arrangements are also possible.

With reference to the drawings, the present disclosure is generally directed to electrochromic panels 10 capable of lightening or darkening when exposed to an electric voltage and/or current. Such electrochromic panels 10 include certain electrochromic materials that, when exposed to electric current or voltage, chemically react in space between opposing sheets of the window or panel, thereby changing light transmittance of the panel. The present disclosure is also directed to electronic controllers and methods for controlling lightening and darkening of an electrochromic panel 10.

According to the present invention, by utilizing repeated electrical pulses, which are referred to herein as "micropulses," the energy in an electrochromic system is increased with faster color change (both during darkening and lightening) without damaging the electrochromic materials contained in the panels 10. For example, a micro-pulse can be a pulse of electric current having a peak potential with an absolute magnitude or absolute value of at least 0.1 volt, or from 0.1 volt to 20 volts, or from 1.0 volt to 3.0 volts. Potential or voltage of a pulse can be measured between electrodes of the panel 10. The micro-pulse can have a duration of less than 0.5 second, from 1.0 μsec to 0.5 second, or from 1.0 msec to 10 msec. Further, since micro-pulses are of such short duration, pulses of greater absolute magnitude can be applied in certain situations, which would otherwise damage components of the panel 10 if applied as longer duration pulses. For example, micro-pulses having a magnitude of 220 volts, as output from a European power outlet, can be applied to the panel 10 as micro-pulses without causing damage to the panel 10. As used herein, an "absolute magnitude" or "absolute value" refers to a numerical value for a number of units above or below 0. Absolute magnitude or value will always be positive. For example, in the case of voltage measured using a volt-meter or similar electronic device, a measured voltage of +5 volts and −5 volts each have an absolute value of 5 volts.

An exemplary electrochromic panel 10 including an electrochromic medium 30 capable of lightening or darkening in response to applied electric voltage and/or current is shown in FIGS. 1A and 1B. The electrochromic panels 10 disclosed herein can be mounted to frame structures along with other electrochromic or conventional panels or transparencies to form vehicle windows, such as an aircraft window. The panels 10 can also be used for building windows, vehicle mirrors, surface coatings, and similar applications without the scope of the present disclosure. The panel 10 can be configured to transition between a darkened state and a lightened state or between a lightened state and a darkened state by applying voltage and/or current to the panel 10 according to a predetermined pattern. In some examples, the panel 10 can also be configured to transition to a partially darkened intermediate state for limiting glare, while allowing an amount of natural light to pass through the panel 10.

The panel 10 includes at least one substrate or sheet, such as a first sheet 12, having a surface which is covered, at least in part, by a conductive coating configured to form an anode 26 and a cathode 28. The electrochromic medium 30 covers at least a portion of each sheet 12 and the anode 26 and cathode 28. In some examples, the panel 10 includes only a single substrate or sheet 12. In that case, both the anode 26 and the cathode 28 may be disposed on a common surface of the substrate or sheet 12. In other examples, as shown in FIGS. 1A and 1B and as described in detail herein, the panel 10 includes at least two sheets, such as a first sheet 12 and a second sheet 14. In that case, the anode 26 can be positioned on one of the sheets, such as the second sheet 14, and the cathode 28 can be positioned on a surface of the first sheet 12. Further, as will be appreciated by those of skill in the art, the invention is not limited by the construction or arrangement of the laminated substrates, layers, sheets, and conductive coatings described herein. Instead, the principles of inducing color change and/or adjusting light transmittance of an electrochromic panel by applying current or voltage in different sequences or profiles can be used with numerous commercially available or manufactured electrochromic panels, such as panels manufactured by Magna International Inc. of Holland, Mich., Gentex Corporation of Zeeland, Mich., or View Inc. of Milpitas, Calif. An exemplary electrochromic panel including opposing glass substrates coated with a conductive film to form an anode and a cathode and an electrochromic film, such as a tungsten oxide film, spaced between the anode and the cathode, is disclosed in U.S. Pat. No. 5,066,111, entitled "Electrochromic window with integrated bus bars" the disclosure of which is incorporated herein by reference in its entirety.

The transmittance or light transmission of the panel 10 can be selected based on requirements of particular applications. In general, the lightened state can refer to a state in which transmittance through the panel is at least 50% or at least 70%. A darkened state can refer to a state in which transmittance through the panel 10 is less than 20% or less than 10%. For windows which adjust transmittance or light transmission to reduce sun glare, the panel 10 may allow a substantial amount of visible light, such as from 20% to 40% of visible light in a wavelength of 390 nm to 700 nm, to pass through the panel 10 even in the darkened state. For panels 10 in which the darkened state is intended to replace traditional plastic (opaque) light shades, the panel 10 may need to become darker (e.g., the visible light transmission through the panel may need to be reduced compared to glare reducing panels) so that minimal light (e.g., less than 5% of visible light) passes therethrough so that vehicle passengers are not exposed to daylight.

The range of visible light transmission of the electric panel 10 is generally based on the material composition of the electrochromic material and the sequence and intensity of electric current/voltage applied to the panel 10. Some panels 10 are capable of maintaining a stable light transmittance in a broad range of transmittance levels. For example, some commercially available panels are capable of darkening from 70% to 0.005% light transmittance (% Y). Other panels are capable of darkening from 65% to 0.0000001% light transmittance. In other examples, a darkened state may refer to a state in which less than 20% or less than 10% of visible light passes through the panel 10.

Visible light transmittance through the panel 10 can be measured using conventional measurement techniques as known in the art. For example, testing in accordance with ASTM E972 can be used for determining a level of visible light transmittance through the panel 10. Panel transmittance over multiple wavelengths can be determined using equipment such as a spectrophotometer (e.g., the Varian Cary® 6000i UV-Vis-NIR spectrophotometer by Agilent Technologies) to measure transmittance through the panel 10 over a wide spectrum. In some examples, measurements are taken by the spectrophotometer multiple times per minute as the panel 10 is switched to various transmittance settings. Another method for testing transmittance of visible light through the panel 10 includes providing a light source of known wavelength and intensity positioned to shine through the panel 10 and measuring light transmittance on the opposite side of the panel 10 from the light source using a photodetector. In both cases, full darkening and full lightening are determined by allowing the panel 10 to reach a steady state in which light transmittance through the panel 10 remains constant or changes by an a small amount (e.g., less than 1.0%). The switching time is then determined by evaluating the time it takes to reach the maximum or minimum transmittances, or some high percentage thereof (like 95% or 99%). For example, if a 95% criterion is used, and a panel reaches a steady state 60% transmittance after 3 minutes of lightening and a steady state 0.0001% transmittance after 3 minutes of darkening, then the time to fully switch is evaluated by the time it takes for a system in the 0.0001% transmittance state to achieve 57% transmittance after the signal to switch has been applied.

Exemplary Aircraft Transparency

As previously described, an electrochromic panel 10 can be used to form an aircraft window or transparency. A panel 10 including two sheets, such as a first sheet 12 and a second sheet 14, used as an aircraft window or transparency is shown in FIGS. 1A and 1B. The electrochromic panel 10 includes the first sheet 12 and the second sheet 14 formed from a transparent or semi-transparent material, such as a material having a visible light transmittance of at least 90%. The sheets 12, 14 are mounted together to form an enclosed or partially enclosed interior space or cavity, which is generally referred to by number 16 in FIG. 1B. A seal or frame 36 can extend around the edges of the sheets 12, 14 for protecting portions of the sheets 12, 14 and/or materials contained in the cavity 16. Generally the sheets 12, 14 are formed from glass. The sheets 12, 14 can be chemically strengthened glass sheets, heat strengthened glass sheets, or heat tempered glass sheets. The sheets 12, 14 can also be a laminate polymer material formed from a plurality of laminated polymer layers, such as polyurethane layers, acrylic layers, or poly carbonate layers. The sheets can also be formed as cast sheets including a single layer of a polymer material. The panel 10 can also include additional sheets and/or interlayers (i.e., vinyl or urethane interlayers) provided either above or below the first sheet 12 and the second sheet 14. Further, multiple panels can be mounted to a frame structure thereby forming a window having an inner panel, one or more intermediate panels, and an outer panel. The outer panel may be deformable and configured to flex in response to pressure differences between an aircraft cabin and atmosphere. The outer panel may include holes, apertures, or openings such that atmospheric pressure is also exposed to the inner panel. In that case, the inner panel may deform upon changes in pressure between the inner panel and the outer panel.

The first sheet 12 and the second sheet 14 of the electrochromic panel 10 each include an inner surface 18, defined herein as a surface facing towards the cavity 16, an outer surface 20 opposite the inner surface 18, longitudinal edges or sides 22, and latitudinal edges or sides 24 extending between the inner surface 18 and the outer surface 20. At least a portion of each of the inner surface 18 of each of the first sheet 12 and the inner surface 18 of the second sheet 14 is coated with a transparent or semi-transparent electrically conductive coating to form the anode 26 and the cathode 28 for directing electrical current through the sheets 12, 14. The anode 26 and the cathode 28 are formed from an indium tin oxide (ITO) covered glass, acrylic, or polycarbonate sheet mounted to the first sheet 12 and/or the second sheet 14. The anode 26 and the cathode 28 can be reversible.

Referring to FIGS. 1A and 1B, the electrochromic layer or medium 30 is disposed within the cavity 16 between the inner surfaces 18 of the sheets 12, 14. The electrochromic medium 30 may comprise a viologen and/or phenazine compound. A "viologen" may refer to a quaternary 4,4'-bipyridinium salt or derivative thereof. A "phenazine" compound may refer to phenazine (9,10-diazaanthracene) itself as well as derivatives thereof, such as, for example, di-isopropyl phenazine and dimethyl phenazine. Other electrochromic materials, as are known in the art, can be used within the scope of the present disclosure. The electrochromic medium 30 can be in the form of a solid layer, liquid, or gel. The cavity 16 can also be filled with other fillers or insulating materials, provided that the electrochromic medium 30 is well dispersed through the filler material. The electrochromic medium 30 may be dispersed within a polymer gel or within a polymer film. When electric current is passed between the conductive coatings of the anode 26 and cathode 28, portions of the electrochromic medium 30 are configured to be repositioned within the cavity 16, thereby affecting the transmittance of the panel 10 (e.g., an amount of visible light passing through the panel 10). In other examples, the electrochromic medium 30 can include one or more metal oxide materials, such as, tungsten oxide ($WO_3$), molybdenum oxide ($MoO_3$), niobium oxide ($Nb_2O_5$), titanium oxide ($TiO_2$), copper oxide (CuO), iridium oxide ($Ir_2O_3$), chromium oxide ($Cr_2O_3$), manganese oxide ($Mn_2O_3$), vanadium oxide ($V_2O_5$), nickel oxide ($Ni_2O_3$), and cobalt oxide ($Co_2O_3$).

The electrochromic medium 30 can arranged such that electric current applied to the panel 10 in a first direction or polarity for a period of time causes the panel 10 to darken and/or to remain in a darkened state, which is referred to herein as maintaining darkening. The electric current may be applied continuously to maintain darkening. Alternatively, the current can be applied as a repeating series of pulses to cause and/or maintain darkening. In general, when an electric circuit connecting the panel to a power source is opened (e.g., the panel 10 is disconnected from the power source) or when the panel 10 is short circuited to permit current flow between the anode 26 and the cathode 28, the panel 10 begins to lighten. Applying electric current in an opposite or second polarity rather than merely turning off the current causes the panel 10 to lighten more quickly. More specifically, it is believed that constant applied current causes species of the electrochromic medium 30 to congregate near or bond to the conductive coating of one of the sheets. Ceasing the current or applying current in the opposite direction or polarity releases or repels the congregated species and causes them to disperse through the cavity 16, thereby causing the panel 10 to lighten.

For convenience, voltage and/or current applied to cause the electrochromic panel 10 to darken is described herein as being a positive voltage and/or as a voltage applied in a first direction or polarity. Voltage applied to an electrochromic panel 10 to cause the panel 10 to begin to lighten and to transition from a darkened state to the lightened state is described as a negative voltage and/or as a voltage applied in a second direction or polarity. It is understood, however, that the applied voltage could be reversed by, for example, reversing leads connecting the panel 10 to a power source. For example, wires connected to electric leads of the panel 10 could be reversed such that a continuous negative voltage is applied to the panel 10 to maintain the panel 10 in a darkened state. In that case, to transition the panel 10 to its lightened state, a pulsed or continuous positive voltage would be applied to the panel 10.

As shown in FIG. 1A, the panel 10 can also include electric leads 32, 34 for connecting the conductive coatings of the anode 26 and cathode 28 of the panel 10 to a power source. For example, the panel 10 can include a positive lead 32 in electric connection with the cathode 28 and a negative lead 34 in electric connection with the anode 26. The leads 32, 34 can extend from a side of the panel 10 and towards electronic circuitry including the power source or a controller device. The leads 32, 34 may be connected to or associated with another electrical connector mounted to the panel 10 as is known in the art. For example, leads 32, 34 may extend from the anode 26 and cathode 28 to an electrical socket or connector. In that case, the socket or connector can be used for connecting the panel to the power source or controller.

Window Darkening and Lightening System

Figure 2:
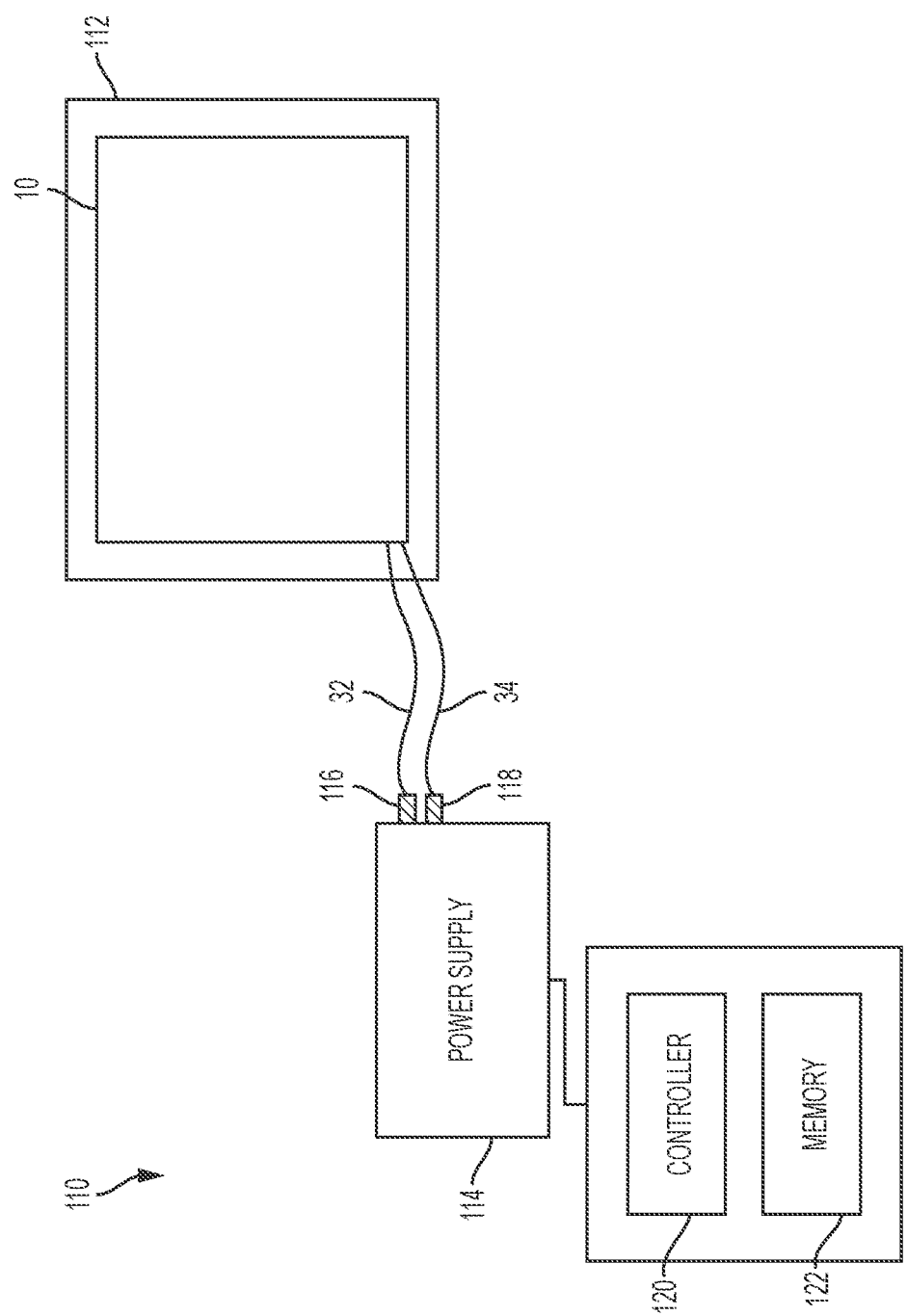
FIG. 2 is a schematic drawing of a system for pulsed electrical control of an electrochromic panel according to an embodiment of the present disclosure.

As shown in the schematic drawing illustrated in FIG. 2, the electrochromic panel 10 is connected to electronic circuitry including power generating components and processing components, thereby forming a system 110 for controlling transmittance of a window 112 formed from one or more electrochromic panels 10. Electronic circuitry can include microprocessors, resistors, switches, capacitors, batteries, power sources, and similar components. In some examples, as shown in FIG. 2, the system 110 includes a single window 112 including a single panel 10. In other examples, the system 110 can include multiple panels connected in series or in parallel.

The electronic circuitry can include a microprocessor or computer device, such as a controller 120, configured to generate instructions for controlling how voltage and/or current are applied to the panel 10. The electronic circuitry may be be configured to adjust a voltage and/or current applied to an electrochromic panel 10 using components or elements of the circuit and without receiving instructions from a controller, processor, or computer device. For example, electric circuitry including resistors and switches for opening a circuit or shorting the leads 32, 34 of the circuit can be used rather than a controller, processor, or computer device.

The system 110 also includes a power supply 114 electrically connected to the leads 32, 34 of the panel 10 to form the circuit. For example, a first wire or terminal 116 extending from the power supply 114 can be connected to the lead 32 extending from the cathode and a second wire or terminal 118 extending from the power supply 114 can be electrically connected to the lead 34 extending from the anode. In this arrangement, current passes from the power supply 114, to the cathode, and through the cavity of the panel 10. Different types of power sources and signal drivers, as are known in the art, can be used for applying electric current to the panel 10. For example, power supplies and control devices for controlling transitioning of electrochromic panels are commercially available from Gentex Corporation, Magna International Inc., and others.

As shown in FIG. 2, the controller 120 is electrically connected to the power supply 114. The controller 120 can be a computer processor, such as a microprocessor, associated with the power supply 114. In other examples, the controller 120 is a separate computer device electrically connected to and/or in electrical communication with the power supply 114. The controller 120 includes computer readable memory 122 including instructions that, when executed by the controller 120, cause the controller 120 to control operation and output of the power supply 114. For example, as described herein, the controller 120 can be configured to cause the power supply 114 to apply a voltage to the panel 10 according to a voltage profile or predetermined pattern of longer duration pulses (e.g., from 1 second to 20 seconds or longer), micro-pulses, and/or to apply a continuous voltage for a period of time to control transmittance of the panel 10. As previously described, an absolute magnitude of voltage of the pulses applied by the power supply 114, as controller by the controller 120, can be from 0.1 volt to 220 volts or from 1.0 volt to 3.0 volts. In some examples, micro-pulses can be interspersed between periods of longer duration pulses or periods in which a voltage is applied substantially continuously for a period of time of 10 seconds or more.

Patterns for Applying Voltage and/or Current

As discussed above, the computer device or controller 120 is configured to deliver and/or to cause a power supply to deliver a voltage and/or current profile or pattern comprising pulses, micro-pulses, and/or periods of continuous voltage and/or current to cause darkening and lightening of the panel 10. Micro-pulses may be provided at regular intervals for a predetermined duration. Alternatively, micro-pulses may be grouped together followed by longer pauses between the groups of micro-pulses. Micro-pulses can also be interspersed between longer duration pulses or between periods of substantially continuous voltage and/or current. A longer duration pulse may be a pulse of from 1 second to 20 seconds or longer. A period of continually applied voltage and/or current may last from 30 seconds to 1 minute or longer.

Figure 3:
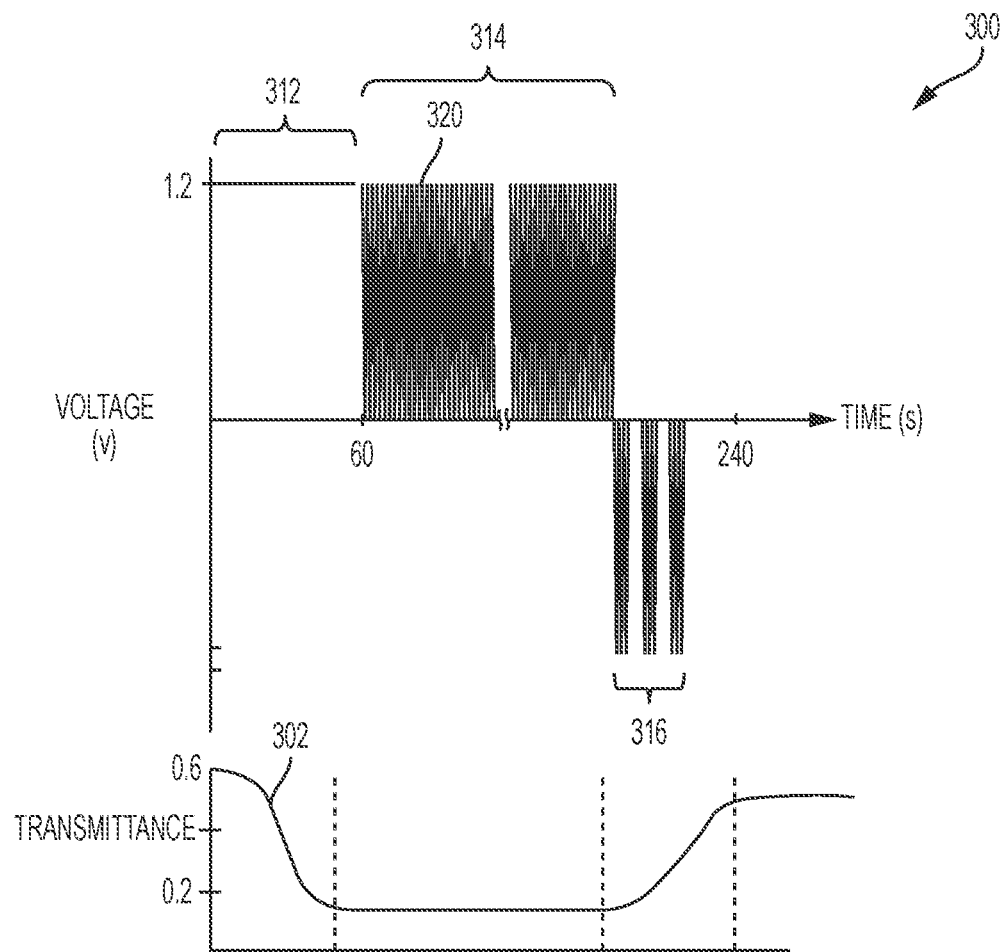
FIG. 3 is a graph of a voltage profile for darkening and lightening of an electrochromic panel according to an embodiment of the disclosure.

In general, a voltage and/or current profile or pattern can be applied to cause the panel 10 to darken, cause the panel to maintain a darkened state, or cause the panel to transition from the darkened state to the lightened state. Ceasing the applied voltage and/or current (e.g., applying 0 volts) to the panel 10 causes the panel 10 to slowly transition to and/or remain in a lightened state. A voltage profile 300 which can be applied to an electrochromic panel 10 and a transmittance curve 302 showing changes in an amount of visible light passing through the panel are shown in FIG. 3. As shown in FIG. 3, the absolute magnitude of the applied voltage is 1.2 volts. However, it should be understood that the positive voltage applied to the panel 10 can be from 0.1 volt to 220 volts or from 1.0 volt and 3.0 volts.

As shown in FIG. 3, a voltage profile 300 includes a first portion 312 for causing the panel to darken (e.g., to transition from a lightened or bleached state to a darkened state). The panel 10 is generally transitioned to the darkened state by exposing the panel 10 to a voltage in a first direction or polarity. As used herein, for convenience, the voltage to effectuate darkening is referred to as the "positive voltage". As shown in FIG. 3, a continuous positive voltage of 1 minute in duration is applied in the first portion 312; however, micro-pulses or longer duration pulses could also be applied. Desirably, the panel transitions to a fully darkened state within a short period of time of 1 minute or less. As shown by the transmittance line 302, transmittance of visible light through the panel 10 during the first portion 312 decreases from 60% to 20%.

As shown by portion 314 of the voltage profile 300, the panel 10 is maintained in the darkened state by continuing to apply positive voltage to the panel 10. The positive voltage can be applied continuously or periodically. For example, the positive voltage can be applied as a series micro-pulses 320. In other examples, a continuous positive voltage and/or current can be applied for a period of time. As shown in FIG. 4B, negative voltage pulses may also be applied to maintain the panel 10 in the darkened state. The length of time for maintaining the darkened state is determined based on how the electrochromic panel is used and may be as long as several hours or days. For example, when used as an aircraft passenger window, an electrochromic window may remain in a darkened state during times when most passengers wish to sleep or for an entire flight of 3 hours or longer.

The voltage profile 300 also includes a portion 316 for transitioning the panel 10 from the darkened state to the lightened state as quickly as possible. Transmittance time is based, in part, of a size of the panel 10. As such, transition time for a panel 10 that is 12"×12" in size is, desirably, 1 minute or less. Generally, the transition to the lightened state begins by exposing the panel 10 to a voltage and/or current in a second polarity opposite the polarity of applied voltage and/or current which causes the panel to darken. As used herein, for convenience, voltage to effectuate lightening is referred to as the "negative voltage". Negative voltage can be applied as a series of pulse or micro-pulses. Once the panel 10 begins to lighten, the electric circuit between the power supply and panel 10 can be short circuited or the current output by the power supply can be reduced or ceased. The panel 10 continues to lighten until the lightened state is reached. As shown by the transmittance line 302, in the lightened state 60% of visible light may pass through the panel 10.

Patterns for Darkening and for Maintaining a Panel in a Darkened State

Figure 4A:
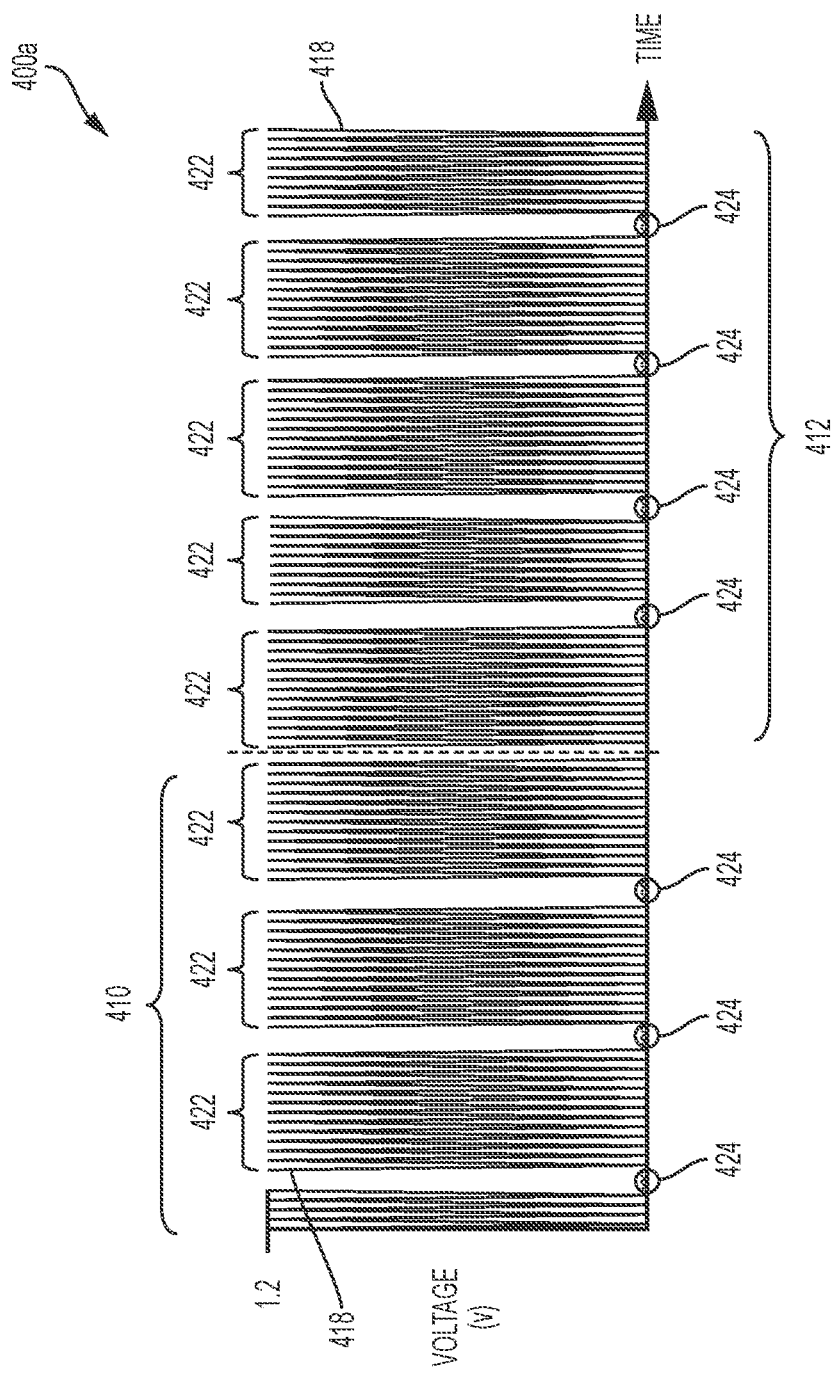
FIG. 4A is a graph illustrating a voltage profile including a pattern of positive voltage and/or current micro-pulses for causing an electrochromic panel to darken according to an embodiment of the present disclosure.

With reference to FIGS. 4A and 4B, enlarged portions of exemplary voltage profiles 400a, 400b or patterns for transitioning an electrochromic panel 10 to the darkened state and for maintaining the panel 10 in the darkened state are illustrated. The profiles 400a, 400b include a first portion 410 including an applied voltage in the positive polarity, which causes darkening of the panel 10. In FIGS. 4A and 4B, the positive voltage applied during the first portion 410 includes groups 422 of positive voltage micro-pulses 418. The groups 422 are separated by pauses 424 of from 1.0 µsec to 0.5 second or from 1.0 msec to 10 msec in duration. Longer duration pauses between the groups 422 of 0.5 second, 1.0 second, or longer could also be used within the scope of the present disclosure.

The profiles 400a, 400b also include a second portion 412 for maintaining the panel 10 in the darkened state. As shown in FIG. 4A, in some cases, the same voltage pattern used for darkening the panel 10 is also used for maintaining the panel 10 in the darkened state. Specifically, as shown in FIG. 4A, the pattern of groups 422 of micro-pulses 418 followed by pauses 424 continues to maintain the panel 10 in the darkened state. The pattern continues until an instruction is received by the controller and/or power supply to begin transitioning the panel 10 to the lighted state.

Applying micro-pulses to maintain the panel 10 in the darkened state is believed to improve distribution of the electrochromic medium 30 through the cavity 16 between the sheets 12, 14. Since when exposed to voltage in one polarity for a prolonged period, species associated with the electrochromic medium congregate near or become bonded to the conductive coating or electrodes, the micro-pulses are believed to release or repel the species from the electrodes and/or to redistribute the electrochromic material within the cavity. As a result of such periodic redistribution of materials, the panel 10 may be better able to quickly transition to clear or become substantially transparent than prior art systems since species of the electrochromic material are not bonded to the electrodes or otherwise immobilized while the panel is maintained in the darkened state.

In another example, as shown in FIG. 4B, the second portion 412 of the profile 400b includes a combination of positive voltage micro-pulses 418 and negative voltage micro-pulses 426. Applying negative voltage micro-pulses 426 may further improve the mobility of the species of the electrochromic medium and, in particular, prevents species of the electrochromic medium from becoming bonded to the electrodes or conductive coating. Various patterns of positive and negative voltage pulses can be applied within the scope of the present disclosure. For example, groups of positive and negative voltage micro-pulses can be applied in an alternating fashion as shown in FIG. 4B. Specifically, as shown in FIG. 4B, a group 422 of twenty positive voltage micro-pulses are applied followed by a brief pause 424. Following the brief pause 424, a group 428 of twenty negative micro-pulses 426 is applied. The pattern of groups 422 of positive voltage micro-pulses 418 and groups 428 of negative voltage micro-pulses 426 can be continued until an instruction is received from the controller or power source to begin lightening of the panel 10. In other examples, negative voltage can be applied less frequently or in a different shape or duration than positive voltage. For example, the groups 422 of positive voltage micro-pulses 418 can be applied for a period of time (e.g., 1 minute, 2 minutes, or longer). After that time, a long duration negative voltage pulse of 1 second or longer could be applied to clear the electrochromic medium.

Patterns for Fast Bleaching or Lightening of an Electrochromic Panel

The voltage and/or current profile for maintaining the darkened state continues until an instruction is received by the controller or power supply to begin clearing the panel (e.g., begin transitioning the panel to the lightened state). An enlarged portion of an exemplary voltage profile or pattern 500 for causing the panel to transition from the darkened state to the lightened state is illustrated in FIG. 5A. The pattern 500 includes a plurality of negative voltage micro-pulses 526. As described herein, micro-pulses 526 can be less than or equal to 0.5 second in duration, from 1.0 μsec to 0.5 second in duration, or from 1.0 msec to 10 msec.

Applying negative voltage and/or current micro-pulse effectively initiates a process of repositioning electrochromic material within the panel 10. For example, applying the negative voltage effectively disperses the electrochromic material from the electrodes and/or inner surfaces of the panel causing lightening. When applying micro-pulses to the electrochromic panel, lightening time is reduced compared to when longer duration or continuous voltage and/or current is applied. As such, more responsive windows can be produced which are desirable in many applications.

As previously described, micro-pulses 526 can be applied in groups 528. For example, as shown in FIG. 5A, the groups 528 include twenty negative voltage micro-pulses, each of which is separated by a short or first pause 523. Following the group 528 of micro-pulses 526, a longer duration or second pause 524 occurs. For example, the short or first pause 523 between micro-pulses 526 can be a similar duration to the micro-pulse (e.g., 0.5 second or less). In other examples, the short pause between micro-pulses can be longer than 0.5 second in duration or from 0.5 second to 1.0 second in duration. The pattern of grouped micro-pulses separated by longer duration pauses occurs for a period of time sufficient for the panel to begin to transition to the lighted state. Once the panel begins to lighten, the micro-pulses may cease, as shown by portion 522 of FIG. 5A. However, the panel continues to transition after pulses are ceased as shown by the transmittance line 302 in FIG. 3. For example, negative voltage pulses may be applied for from 10 seconds to 60 seconds, or preferably 40 seconds. The panel may continue to lighten for an additional 20 seconds, such that the total lightening time is 1 minute.

In the examples shown in FIGS. 3 and 5A, the absolute value of the voltage of the micro-pulses 526 is substantially the same (e.g., −1.2 volt) as the panel transitions from the darkened phase to the lightened phase. The inventors have discovered that gradually reducing the absolute magnitude of voltage applied to the panel reduces lightening times compared to when a voltage of the micro-pulses is constant. An absolute magnitude of applied voltages can be gradually reduced according to a variety of different patterns and amounts. In some cases, pulses 526 could decrease sequentially by discrete amounts. For example, each micro-pulse 526 could have an absolute magnitude of 0.01 volt less than an immediately preceding pulse. In other examples, an absolute magnitude of micro-pulses 526 could decrease according to a parabolic function, logarithmic function, or in a step-wise manner.

Figure 5B:
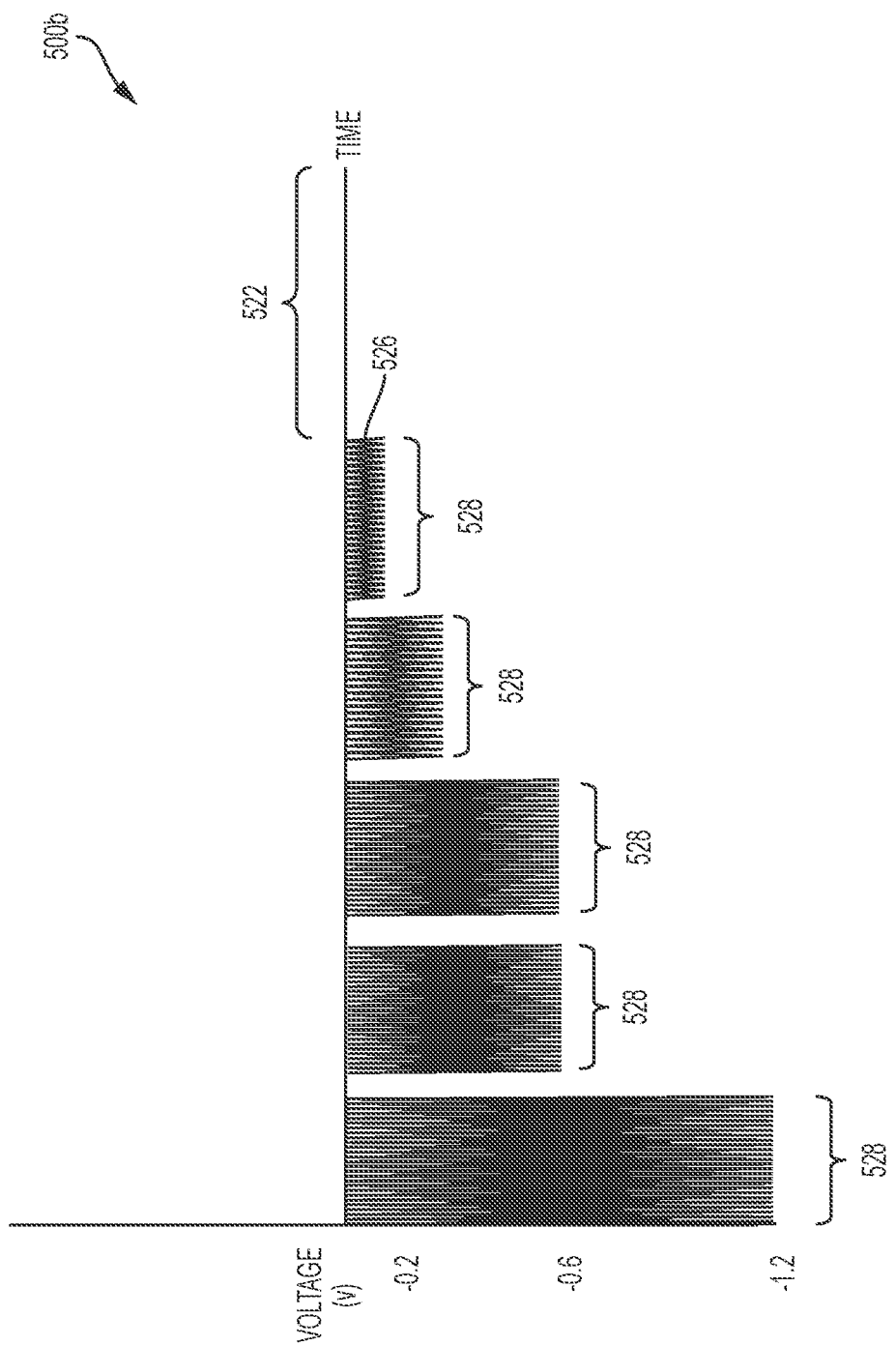
FIG. 5B is a graph illustrating another voltage profile for lightening or bleaching an electrochromic panel according to an embodiment of the disclosure.

An enlarged portion of an exemplary voltage profile or pattern 500b for causing the panel to transition from the darkened state to the lightened state and including a gradually decreasing applied voltage is illustrated in FIG. 5B. The pattern 500b includes negative voltage micro-pulses 526 applied in a gradient or gradually decreasing manner in which an absolute magnitude of voltage of the micro-pulses decreases as the panel lightens. As in previously described examples, micro-pulses 526 can be applied in groups 528. For example, as shown in FIG. 5B, a micro-pulses 526 in a first bunch or group 528 are applied at a voltage of −1.2 volts. Second and third groups 528 of micro-pulses 526 are applied at a voltage of −0.6 volts. A fourth group 528 of micro-pulses 526 is applied at a voltage of −0.3 volts, and a fifth group 528 of micro-pulses 526 is applied at −0.15 volt.

Once the panel begins to lighten, the micro-pulses may cease, as shown by portion 522 of FIG. 5B. However, the panel continues to transition after pulses are ceased as shown by the transmittance line 302 in FIG. 3. For example, negative voltage pulses may be applied for about 40 seconds. The panel may continue to lighten for an additional 20 seconds, such that the total lightening time is 1 minute. As described herein, the lightened state can refer to a state in which transmittance through the panel is at least 50% or at least 70%.

Another exemplary pattern for lightening of the electrochromic panel is illustrated in FIG. 6. The voltage profile 600 includes a combination of negative voltage micro-pulses 626 and longer duration pulses 632. Specifically, the profile 600 includes groups 628 of the negative voltage micro-pulses 626, as previously described. Following a group 628 of micro-pulses 626, a pause 624 followed by the longer duration pulse 632 is provided. The long duration pulses 632 can be 0.5 second or longer in duration. The pause 624 can be any length sufficient to cause the panel to lighten in a desired time. For example, the pause 624 can be the same duration as the long pulse 632 (e.g., 0.5 second or longer). In other examples, the pause 624 can be of shorter duration, closer to a duration of a pause 623 between micro-pulses 626. The pattern 600 of FIG. 6 can also be used for darkening the panel 10 or for maintaining the panel 10 in a darkened state. For example, rather than applying only micro-pulses 426 (as shown in FIGS. 4A and 4B), combinations of micro-pulses and longer duration pulses can also be used for causing the panel 10 to darken and/or to maintain the darkened state.

Figure 7:
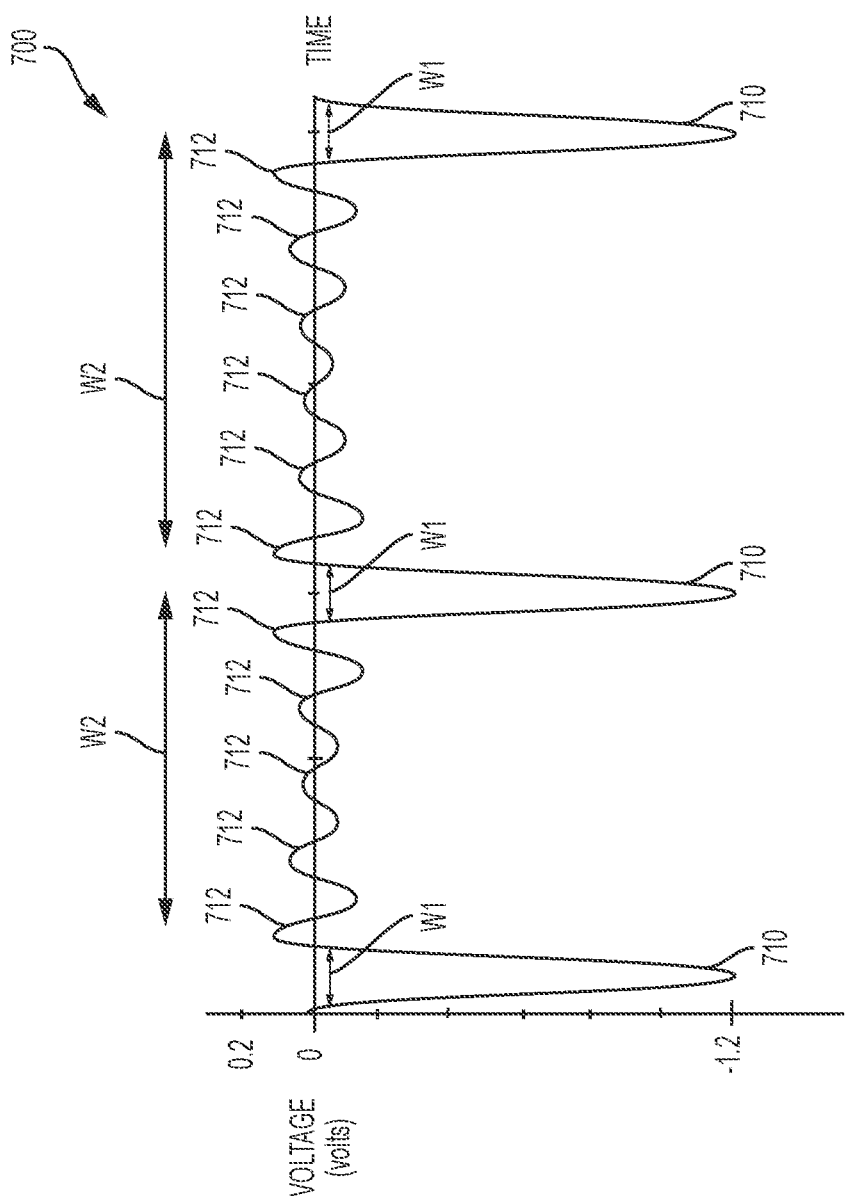
FIG. 7 is a graph of another voltage profile for lightening or bleaching an electrochromic panel including a sinc wave function according to an embodiment of the disclosure.
Figure 8:
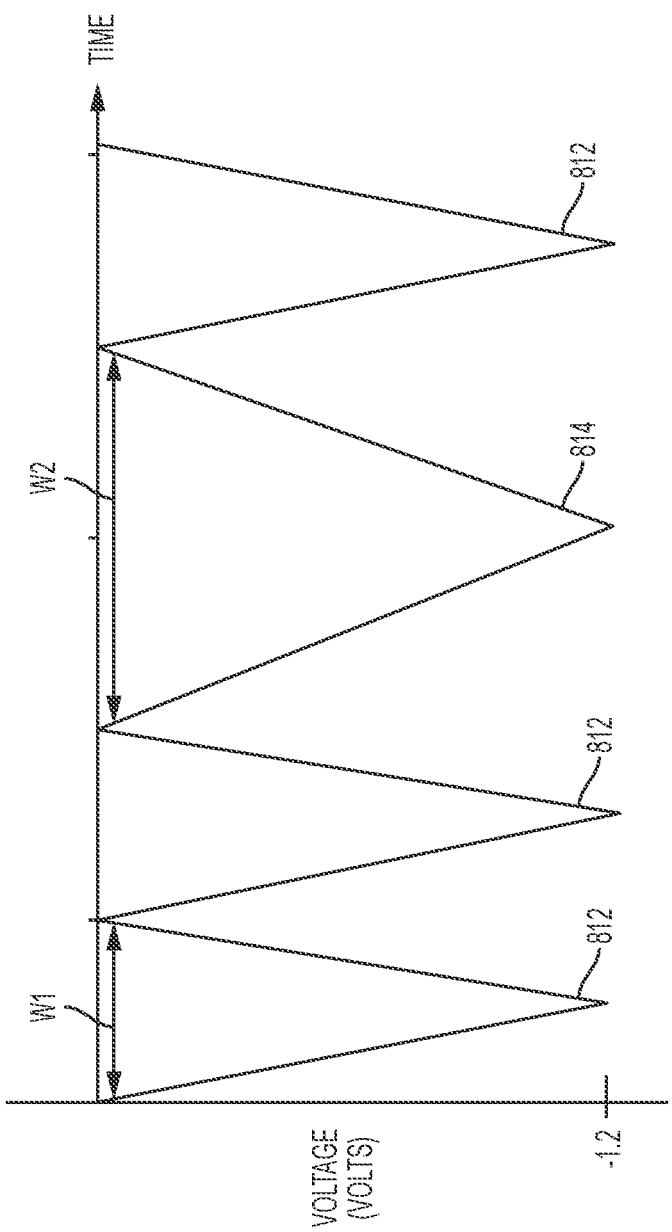
FIG. 8 is a graph of another voltage profile for lightening or bleaching an electrochromic panel including a triangular wave function according to an embodiment of the disclosure.

In FIGS. 3-6, the pulses and micro-pulses are illustrated as 1.2 volt square shaped or rectangular pulses, however, pulses or micro-pulses can be applied in other shapes or patterns. Different waveform shapes are shown in FIGS. 7 and 8. While the waveforms in FIGS. 7 and 8 are shown as negative voltage pulses for causing the panel 10 to lighten, the waveforms could also be used as positive voltage pulses for causing the panel 10 to darken or remain dark or positive or negative current waveforms. For example, the waveforms shown in FIGS. 7 and 8 could be used to provide positive voltage pulses as occurs in FIGS. 4A and 4B.

As shown in FIG. 7, an enlarged portion of a pattern 700 of negative voltage micro-pulses in a shape of a sinc function is illustrated. A sinc function, which is defined as a Fourier transform of a rectangular function, includes uniformly spaced rounded major pulses 710 separated by rounded minor pulses 712 of decreasing amplitude, which can be considered as background voltage. For example, as shown in FIG. 7, the pattern 700 can include major pulses 710 having a maximum absolute amplitude of 1.2 volts separated by minor pulses 712 of lower amplitude. Specifically, for an unscaled sinc function, minor pulses 712 have an amplitude of about 20% or less compared to an amplitude of the major pulses. Accordingly, during periods between major pulses 710, a variable voltage having an absolute magnitude of 0.2 volt or less is applied to the panel 10. As shown in FIG. 7, the sinc function can be centered at 0 volts. Therefore, during periods of minor pulses 712, the signal includes both positive and negative portions. As in previously described examples, the pulses can be uniformly spaced. For example, as shown in FIG. 7, the major pulses can have a width W1 of 0.5 msec. A period W2 between major pulses 712 can be from 0.5 second to 1 second or longer.

As will be appreciated by those skilled in the art, other pulse shapes can also be used within the scope of the present disclosure. For example, positive and/or negative voltage can be applied to the panel as a signal including a sawtooth wave, triangle wave, sine wave, step wave, and others. Such waveforms could also be applied as a controlled current to the system and/or panel. Waves can have a substantially constant width or can vary. For example, as shown in FIG. 8, a triangle wave 800 could include a number of triangle pulses 812 having a first width W1 followed by one or more longer duration triangle pulses 814 having a width W2. For example, the short pulses 812 could be micro-pulses having a duration (e.g., width W1) of less than 0.5 second. The longer pulses 814 could be 1.0 second in duration or longer. In other examples, different shapes or waveforms can be combined together to generate unique voltage and/or current patterns or profiles.

Aircraft With Dimmable Windows

Figure 9:
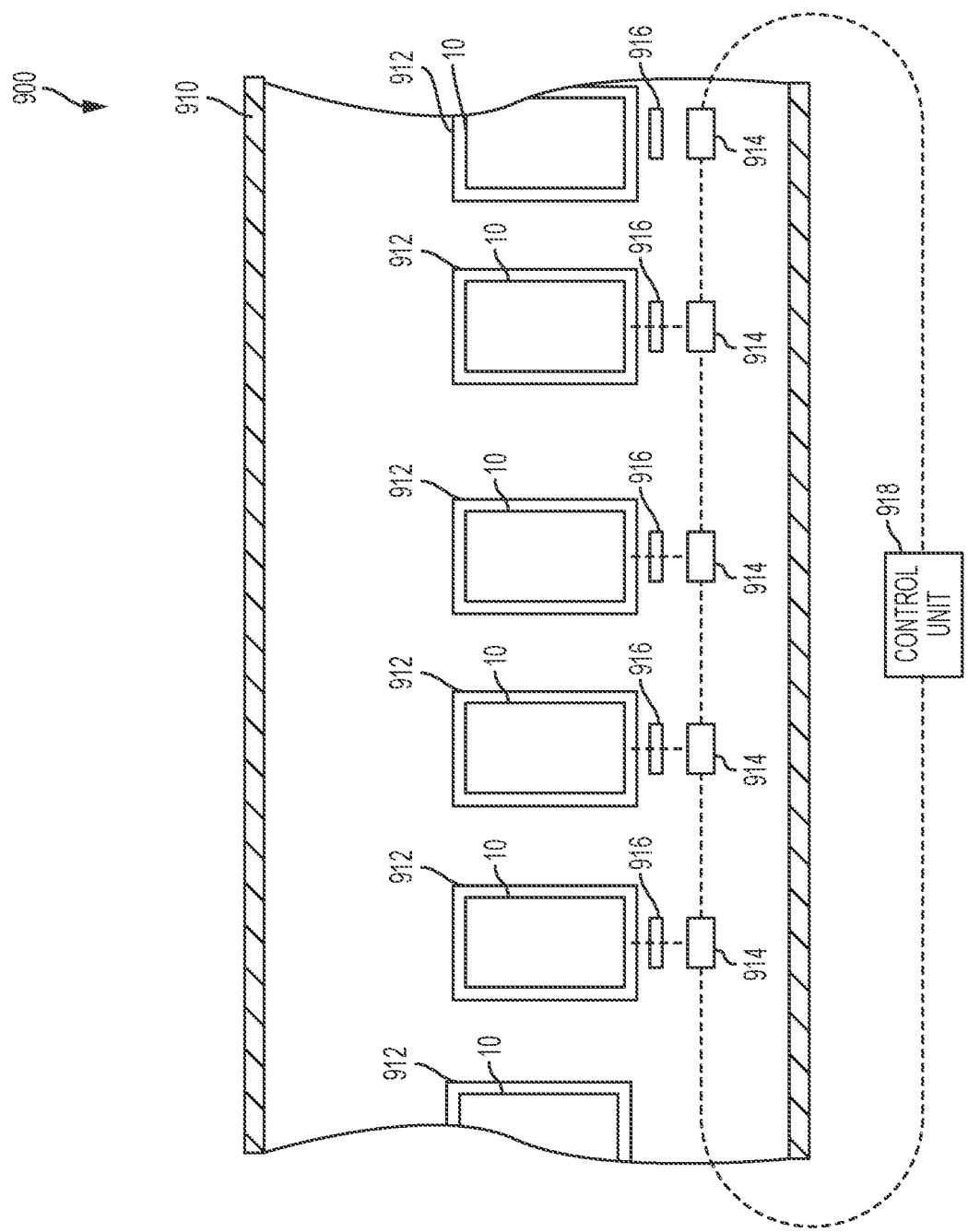
FIG. 9 is a schematic drawing of an aircraft including electrochromic windows and a system for pulsed electrical control of the windows according to an embodiment of the disclosure.

With reference to FIG. 9, a system 900 for controlling transmittance of an electrochromic panel or window can be adapted for use with a passenger vehicle, such as an airplane 910. In other examples, the system 900 can also be adapted for other transportation vehicles, such as busses, trains, or cars. As is known in the art, an airplane 910 includes a plurality of passenger windows 912 extending along a length of the fuselage of the airplane 910. Each window is generally aligned with a row of passenger seats so that passengers in each row can look through a window in that row. As is known in the art, the passenger windows 912 can be formed from one or more polymer or glass panels formed from laminated layers of polymer and/or glass material mounted to a frame for connecting the panels to window openings of the fuselage. At least one of the panels is an electrochromic panel 10 configured to transition between darkened and lightened states. Each of the electrochromic panels 10 can be connected to a power supply 914 for providing electric current to the panel 10 to cause the panel 10 to lighten or darken. Each power supply 914 can be connected to a control button, such as a dimmer switch 916, which allows the passenger to lighten or darken the window near his or her seat. The dimmer switch 916 can be positioned on an inner wall of the aircraft 910 or on a passenger's armrest. The passenger can lighten or darken his or her window 912 using the dimmer switch 916.

The power supply 914 for each of the electrochromic panels 10 may also be connected to a central control unit 918. The central control unit 918 allows flight attendants, pilots, or other airline personnel to lighten or darken all of the panels 10 or selected panels 10 on the aircraft 910 from a central location. For example, an instruction to transition all panels 10 to the lightened state can be entered using the central control unit 918. Such an instruction could be entered, for example, during takeoff and landing when regulations require that passengers and aircraft personnel be able to see through the windows. In response, the control unit 918 sends a single to the power supply 914 associated with each panel 10. If the panel is already light, then no current is applied to the panel. If the panel 10 is dark, then the power supply 914 associated with a respective window applies negative voltage pulses or micro-pulses, as described above in connection with FIGS. 5 and 6.

EXAMPLES

The following examples are presented to demonstrate the general principles of the invention. The invention should not be considered as limited to the specific examples presented.

Figure 10:
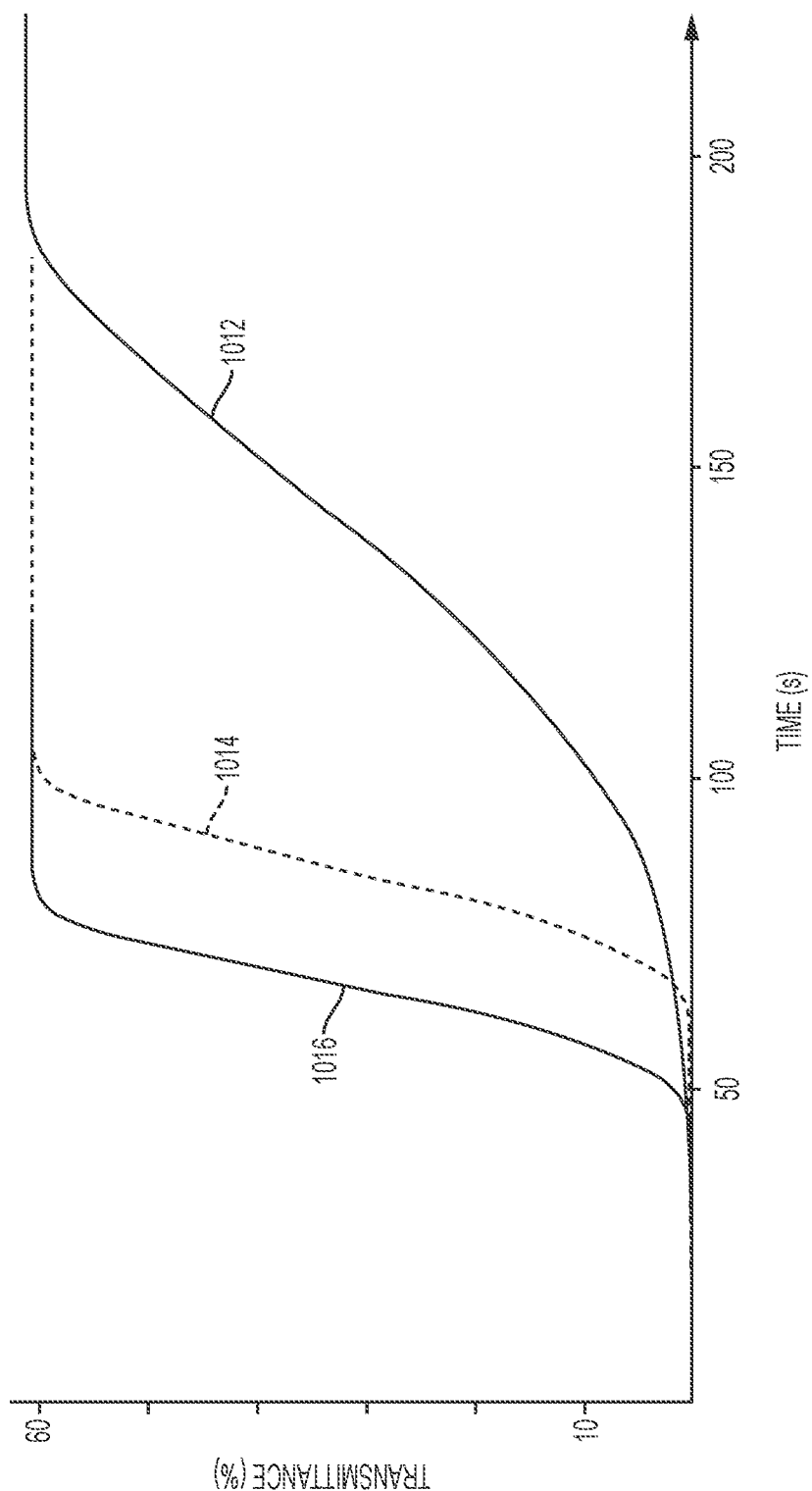
FIG. 10 is a graph illustrating change in light transmittance over time for a panel exposed to patterns of positive and negative voltage pulses according to Examples 1 and 2 and the Comparative Example.

For Examples 1-4 and the Comparative Example, a 12 inch by 12 inch electrochromic panel including opposing glass sheets coated with indium tin oxide (ITO), and viologen and phenazine as an electrochromic medium was used to evaluate lightening times for the voltage patterns or profiles described herein. The panel was connected to a controller and power supply to form a circuit for lightening and darkening the panel. Once the circuit was connected, the power source was activated to apply a continuous positive voltage to the panel to cause the panel to transition to the darkened state in which the panel had a CIE Y transmittance of 0.02% after 10 minutes of maintaining the continuous positive voltage. Once in the darkened state, the panel was exposed to a predetermined pattern of positive and/or negative voltages to maintain the panel in the darkened state. After a predetermined period of time, the panel was exposed to a predetermined pattern of negative voltage pulses to cause the panel to transition from the darkened state to a lightened state having a transmittance of CIE Y 69.5% after 10 minutes of maintaining the lightened setting. Experimental results showing light transmittance through the panel with respect to time are shown in FIG. 10.

COMPARATIVE EXAMPLE

The following examples are presented to demonstrate the general principles of the invention. The invention should not be considered as limited to the specific examples presented.

Figure 11:
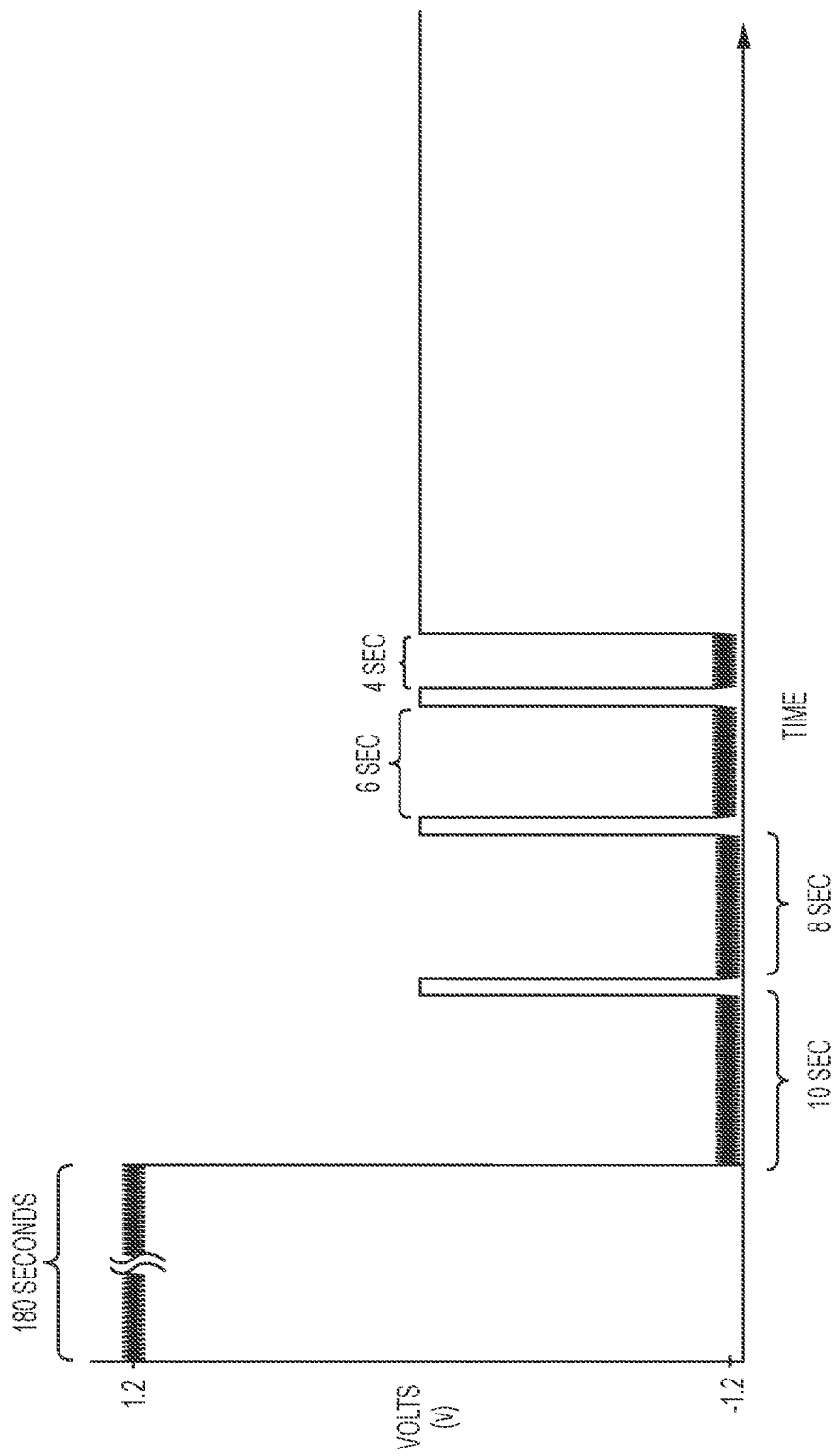
FIG. 11 is a graph of a voltage profile for lightening or bleaching an electrochromic panel using a conventional controller as described in the Comparative Example.

The Comparative Example shows lightening and darkening of the 12 inch by 12 inch electrochromic panel using voltage profile with periods of continuous voltage and without short duration pulses, as is used in commercially available controllers from Gentex Corporation, Magna International Inc., and others. To maintain the panel in the darkened state, the controller applied a continuous voltage of 1.2 volts for 180 seconds. To transition the panel from the darkened state to the lightened state, negative voltage pulses of −1.2 volts were applied according to the following pattern: a 10 second pulse, 2 seconds off, an 8 seconds pulse, 2 seconds off, a 6 seconds pulse, 2 seconds off, and a 4 second pulse. This pattern is shown in FIG. 11. A transmittance curve 1012 for the Comparative Example is shown in FIG. 10. In FIG. 10, time zero is defined as when the negative voltage pulses begin. As shown in FIG. 10, the panel begins to lighten after 40 seconds and stabilizes at a transmittance of 60% after 180 seconds, such that a total transition time was about 140 seconds.

Example 1

The panel was maintained in the darkened state by applying a constant voltage of 1.2 volts for at least 180 seconds. In order to transition the panel to the lightened state, negative voltage micro-pulses, as described above in connection with FIGS. 5A, 5B, and 6, were applied. Specifically, micro-pulses of 0.0002 second in duration separated by a pause of 0.0002 second were applied for 40 seconds. The micro-pulses had a negative voltage of about −1.2 volts. Following the 40 seconds, the micro-pulses were stopped and a voltage of 0 was applied. A transmittance curve 1014 showing time required for the panel to transition from the darkened state to the lightened state is shown in FIG. 10. Specifically, the panel began to lighten at about 60 seconds and became fully lightened at about 110 seconds.

Example 2

Pulses were applied both to maintain the panel in the darkened state and to cause the panel to transition to the lightened state, as shown by the voltage profile in FIG. 5A. Specifically, once the panel was in the darkened state, the darkened state was maintained by applying positive 1.2 volt micro-pulses of 0.0002 second in duration followed by a pause of 0.0002 second for at least 180 seconds. Following the positive voltage micro-pulses, negative voltage micro-pulses of 0.0002 second followed by pauses of 0.0002 second were applied for 40 seconds to cause the panel to lighten. As shown by the transmittance curve 1016, the panel began to transition at about 40 seconds and became fully lightened at about 75 seconds.

Example 3

Figure 12:
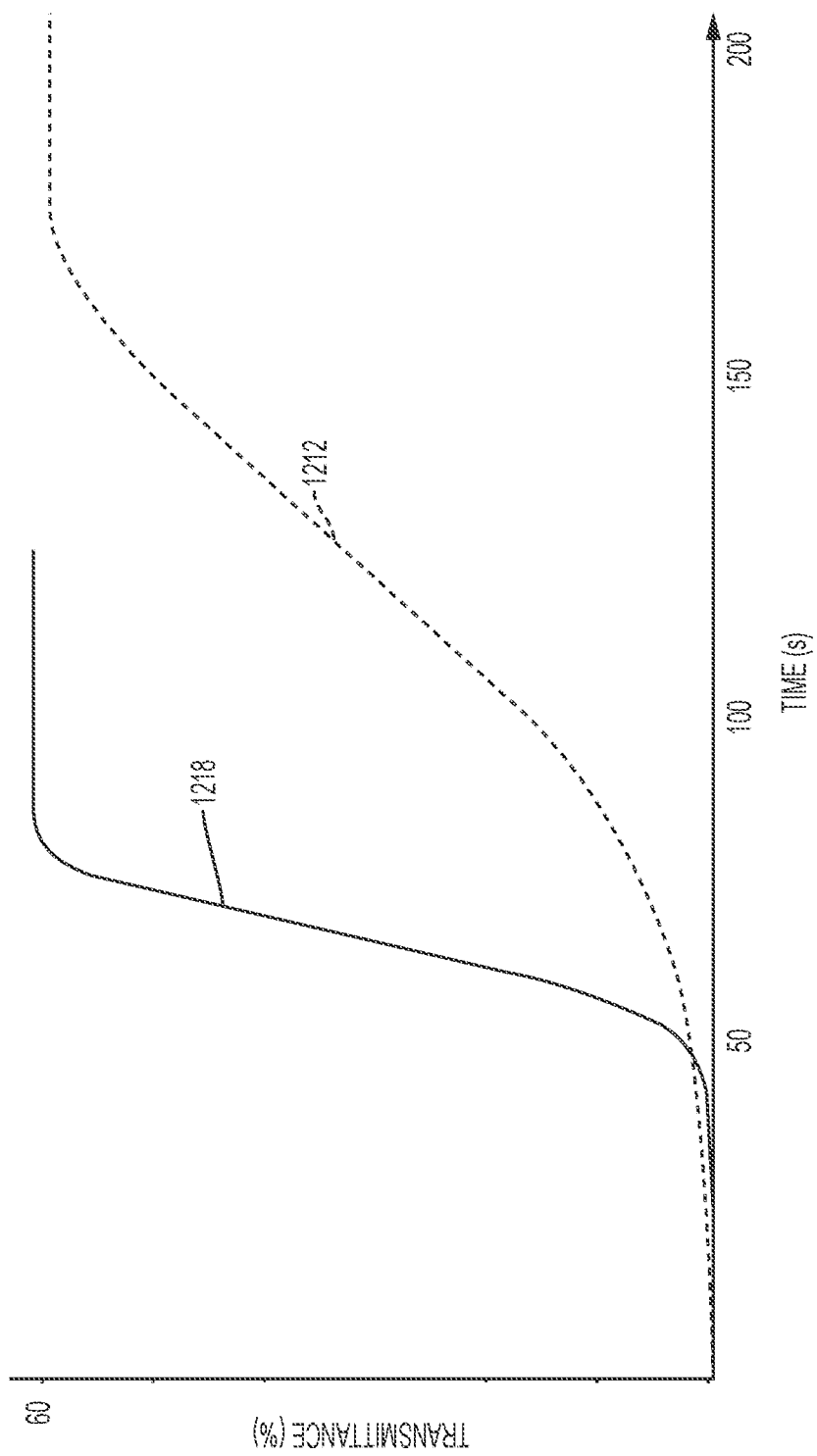
FIG. 12 is a graph illustrating change in transmittance over time for Example 3 and for the Comparative Example.

The panel was darkened by applying a constant positive voltage of 1.2 volts for a sufficient time to cause the panel to become fully dark, having a transparency of less than 1.0%. Then the panel was maintained in the darkened state by applying 1.7 volt micro-pulses having a duration of 0.001 second on/off for 180 seconds. Following the 180 seconds, negative voltage pulses of 1.7 volts and having a 0.1 second "on" time followed by a 0.001 second "off" time were applied for 40 seconds to cause the panel to lighten. Then pulses were stopped and no voltage was applied for 44 seconds, as the panel continued to lighten. FIG. 12 is a graph comparing a transmittance curve 1218 for the applied voltage of Example 3 compared to a transmittance curve 1212 for the standard controller of the Comparative Example, in which direct current was applied to maintain the darkened state and only long duration negative voltage pulses were applied. In FIG. 12, time zero occurred when negative voltage began to be applied to the panels. As shown in FIG. 12, when the voltage profile of Example 3 was applied, the panel began to lighten at about 40 seconds and became fully lighted (e.g., 60% transmittance) in 80 seconds. When the voltage profile of the Comparative Example was applied, the panel did not become fully lightened until 170 seconds, which was 90 seconds slower than in Example 3. The pulsed signal of Example 3 also increased the transmittance of the panel in the unpowered state compared to the Comparative Example, as shown in FIG. 12.

Example 4

The panel was darkened by applying a pulsed positive voltage including 1.0 volt micro-pulses having a 0.1 second "on" time followed by a 0.001 second "off" (e.g., no voltage) time until a darkened state having a transmittance of less than 1.0% was achieved. Then the panel was maintained in the darkened state by continuing to apply 1.0 volt micro-pulses having a duration of 0.001 second on/off for 180 seconds. Following the 180 seconds, negative micro-pulses were applied according to the following pattern or profile: micro-pulses of −1.0 volt and having a 0.1 second "on" time followed by a 0.001 second "off" time were applied for a period of 15 seconds (from 180 seconds to 195 seconds); micro-pulses pulses of −0.8 volt and having a 0.1 second "on" time followed by a 0.001 second "off" time were applied for a period of 15 seconds (from 195 seconds to 210 seconds); micro-pulses of −0.6 volt were applied for 5 seconds (from 210 seconds to 215 seconds); and micro-pulses of −0.5 volt were applied for 5 second (from 215 second to 220 seconds). After 220 seconds, pulses were ceased.

Example 5

Tests were also performed to evaluate effects of pulsed darkening and pulsed maintenance of the darkened state on lightening or bleaching of the panel, but without applying negative voltage micro-pulses to cause the panel to lighten. Specifically, the panel was darkened and maintained in the darkened state by applying positive voltage micro-pulses as described in Examples 1-4. In order to lighten the panel, the electric circuit connecting the panel to the controller and power supply was opened (e.g., the leads were disconnected from the power supply) so that voltage was not applied to the panel. This example is referred to as pulsed darkening, pulsed maintenance, and open bleaching.

Another test was performed with pulsed darkening, pulsed maintenance, and shorted bleaching in which leads from the electrodes were connected together to allow the current from one electrode to pass to the other electrode through the connected leads.

Figure 13:
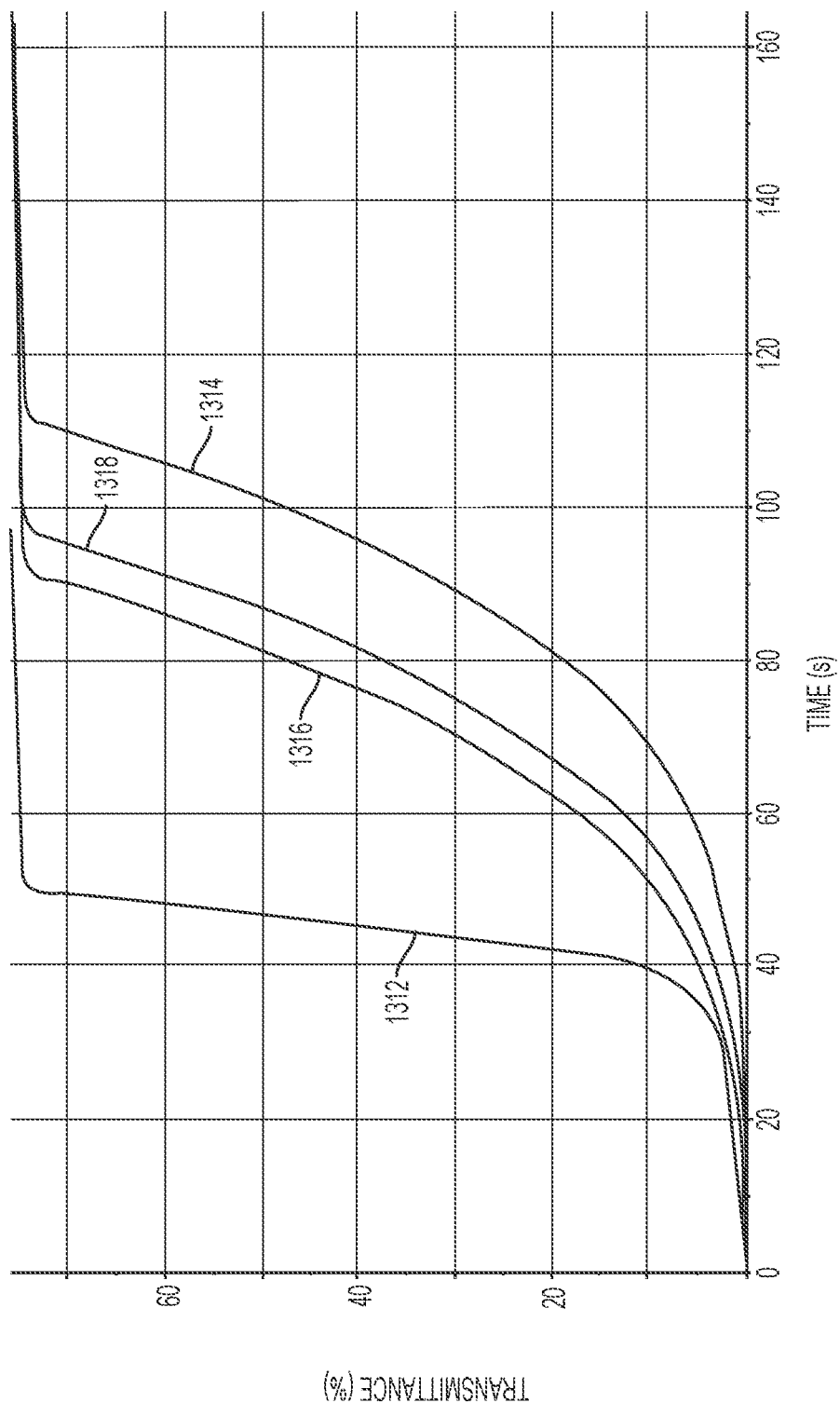
FIG. 13 is a graph illustrating change in transmittance over time for Example 4 and for the Comparative Example.

FIG. 13 is a graph comparing a transmittance curve 1312 for the applied voltage of Example 4 compared to a transmittance curve 1314 for the standard controller of the Comparative Example, in which direct current was applied to maintain the darkened state and only long duration negative voltage pulses were applied. While the time-scale of the graph of FIG. 13 is different from the time-scale in FIGS. 10 and 12, FIG. 13 shows that voltage applied in Example 4 causes the panel to lighten more quickly than occurs using the controller of the Comparative Example. In FIG. 13, time zero occurred when negative voltage began to be applied to the panel. When the voltage profile of Example 4 was applied, the panel began to lighten at about 20 seconds and became fully lighted (e.g., 70% transmittance) in 45 seconds. As shown by transmittance curve 1314, when the voltage profile of the Comparative Example was applied, the panel did not become fully lightened until 110 seconds, which was 65 seconds slower than in Example 4. FIG. 13 also includes transmittance curves for voltage patterns including open bleaching (transmittance line 1316) and shorted bleaching (transmittance line 1318). Transmittance curves 1316, 1318 show that these examples lighten more rapidly than the Comparative Example of curve 1314. As such, it is apparent that pulsed darkening and pulsed maintenance reduce bleaching times even when micro-pulses are not applied as the panel lightens.

In view of the foregoing description and Examples, the present invention thus relates inter alia to the subject matter of the following clauses though being not limited thereto.

Clause 1: A system for controlling light transmittance, comprising: a panel which is capable of at least one of darkening and lightening in response to applied voltage and/or current, the panel comprising at least one substrate, an electrically conductive coating on at least a portion of a surface of the at least one substrate forming at least one electrode, and an electrochromic medium covering portions of the at least one substrate and the at least one electrode and in electrical communication with the electrode; a power supply in electrical communication with the at least one electrode; and electronic circuitry electrically connected to the power supply configured to cause the power supply to apply a voltage and/or current to the at least one electrode according to a predetermined pattern for controlling the transmittance of the panel, wherein the predetermined pattern comprising a plurality of micro-pulses which are less than or equal to 0.5 second in duration.

Clause 2: The system of clause 1, wherein an absolute magnitude of applied voltage and/or current of the micro-pulses is from 0.1 volt to 220 volts and/or is a current which causes micro-pulses of from 0.1 volt to 220 volts to be generated to the panel.

Clause 3: The system of clause 1 or clause 2, wherein the at least one substrate comprises a glass and/or plastic sheet.

Clause 4: The system of any of clauses 1 to 3, wherein the micro-pulses are from 1.0 μsec to 0.5 second in duration.

Clause 5: The system of any of clauses 1 to 4, wherein the predetermined pattern further comprises first time periods between micro-pulses that are longer in duration than one or more of the micro-pulses.

Clause 6: The system of clause 5, wherein the first time periods between the micro-pulses are from 1.0 μsec to 0.5 second.

Clause 7: The system of clause 5 or clause 6, wherein the predetermined pattern further comprises second time periods between groups of two or more micro-pulses, the second time periods being longer in duration than the first time periods.

Clause 8: The system of any of clauses 1 to 7, wherein the panel is capable of transitioning to a darkened state in which less than 20% of visible light passes through the panel and to a lightened state in which more than 50% of visible light passes through the panel.

Clause 9: The system of any of clauses 1 to 8, wherein the electrochromic medium comprises viologen, phenazine, and constituents thereof.

Clause 10: The system of clause 8 or clause 9, wherein the applied voltage and/or current maintains the transmittance of the panel at a selected transmittance, and wherein the predetermined pattern of the plurality of micro-pulses comprises micro-pulses applied in a first polarity with an applied voltage having an applied absolute magnitude of at least 0.1 volt and/or an applied current resulting in a voltage of absolute magnitude of at least 0.1 volt.

Clause 11: The system of clause 10, wherein the predetermined pattern further comprises periodic micro-pulses applied in a second polarity, opposite the first polarity, interspersed with the micro-pulses applied in the first polarity.

Clause 12: The system of any of clauses 1 to 11, wherein the applied voltage and/or current comprising the plurality of micro-pulses causes the panel to darken to a selected transmittance level.

Clause 13: The system of any of clauses 1 to 12, wherein the applied voltage and/or current causes the panel to lighten to a selected transmittance, and wherein the predetermined pattern of the plurality of micro-pulses comprises micro-pulses having an applied voltage with an applied absolute magnitude of at least 0.1 volt and/or an applied current which results in a voltage of at least 0.1 volt.

Clause 14: The system of clause 13, wherein the predetermined pattern further comprises ceasing the micro-pulses before the panel lightens to the selected transmittance.

Clause 15: The system of clause 13 or clause 14, wherein the panel transitions from a darkened state to the selected transmittance level at least 10% faster than occurs by shorting leads of the panel to cause lightening.

Clause 16: The system of any of clauses 1 to 15, wherein the predetermined pattern of the plurality of micro-pulses comprises: a first portion comprising an applied voltage and/or current in a first polarity which causes darkening of the panel to a selected transmittance level; a second portion comprising micro-pulses applied in the first polarity to maintain the panel at the selected transmittance level; and a third portion comprising a plurality of micro-pulses applied in a second polarity, opposite the first polarity, to cause the panel to lighten.

Clause 17: A non-transitory computer-readable medium for directing delivery of electric current and/or voltage from a power supply to an electrochromic panel for controlling light transmittance of the panel, the medium comprising program instructions that, when executed by at least one controller in communication with the power supply, cause the at least one controller to: generate and communicate a first signal to the power supply to cause the power supply to apply a voltage and/or current to the panel to cause the panel to maintain a selected transmittance level; and upon receipt of an instruction to commence lightening of the panel, generate and communicate a second signal to the power supply to cause the power supply to apply a voltage and/or current to the panel according to a predetermined pattern to cause the panel to lighten, wherein the predetermined pattern comprises a plurality of micro-pulses which are less than or equal to 0.5 second in duration.

Clause 18: The non-transitory computer-readable medium of clause 17, wherein the first signal causes the power supply to provide a plurality of micro-pulses to the panel to maintain the panel at the selected transmittance level.

Clause 19: The non-transitory computer-readable medium of clauses 17 or clause 18, wherein an absolute magnitude of applied voltage of the micro-pulses is from 0.1 volt to 220 volts or an applied current resulting in a voltage of absolute magnitude of at least 0.1 volt.

Clause 20: A method for controlling transmittance of an electrochromic panel which is capable of lightening and darkening in response to an applied voltage and/or current, wherein the panel comprises at least one substrate, an electrically conductive coating on at least a portion of a surface of the at least one substrate forming at least one electrode, and an electrochromic medium covering portions of the at least one substrate and the at least one electrode and in electrical communication with the electrode, the method comprising: applying a voltage and/or current to the at least one electrode to cause the panel to maintain the selected transmittance level; and applying a voltage and/or current to the at least one electrode according to a predetermined pattern to cause the panel to lighten, wherein the predetermined pattern comprises a plurality of micro-pulses which are less than or equal to 0.5 second in duration.

Whereas particular embodiments of this invention have been described above for purposes of illustration, it will be evident to those skilled in the art that numerous variations of the details of the present invention may be made without departing from the invention as defined in the appended claims.

The invention claimed is:

1. A system for controlling light transmittance, comprising:
    a panel which is capable of at least one of darkening and lightening in response to applied voltage and/or current, the panel comprising at least one substrate, an electrically conductive coating on at least a portion of a surface of the at least one substrate forming at least one electrode, and an electrochromic medium covering portions of the at least one substrate and the at least one electrode and in electrical communication with the electrode;
    a power supply in electrical communication with the at least one electrode; and
    electronic circuitry electrically connected to the power supply configured to cause the power supply to apply a voltage and/or current to the at least one electrode for a predetermined period of time according to a predetermined pattern to cause darkening or lightening of the panel thereby controlling the transmittance of the panel,
    wherein the predetermined pattern comprises:
        a first portion comprising an applied voltage and/or current in a first polarity which causes darkening of the panel to a selected transmittance level;
        a second portion comprising a plurality of micro-pulses applied in the first polarity to maintain the panel at the selected transmittance level; and
        a third portion comprising a plurality of micro-pulses applied in a second polarity, opposite the first polarity, to cause the panel to lighten, and
    wherein the micro-pulses are less than or equal to 0.5 second in duration.

2. The system of claim 1, wherein an absolute magnitude of applied voltage and/or current of the micro-pulses is from 0.1 volt to 220 volts and/or is a current which causes micro-pulses of from 0.1 volt to 220 volts to be generated to the panel.

3. The system of claim 1, wherein the at least one substrate comprises a glass and/or plastic sheet.

4. The system of claim 1, wherein the micro-pulses are from 1.0 μsec to 0.5 second in duration.

5. The system of claim 1, wherein intervals between micro-pulses are longer in duration than the micro-pulses.

6. The system of claim 1, wherein the plurality of micro-pulses are from 1.0 μsec to 0.5 second in duration and intervals between the micro-pulses are from 1.0 μsec to 1.0 second in duration.

7. The system of claim 1, wherein the predetermined pattern comprises groups of two or more micro-pulses, and rest periods when no pulses are supplied between the groups, and wherein the rest periods are longer in duration than intervals between the micro-pulses.

8. The system of claim 1, wherein the panel is capable of transitioning to a darkened state in which less than 20% of visible light passes through the panel and to a lightened state in which more than 50% of visible light passes through the panel.

9. The system of claim 1, wherein the electrochromic medium comprises viologen, phenazine, and constituents thereof.

10. The system of claim 1, wherein the second portion of the predetermined pattern comprises micro-pulses which are less than or equal to 0.5 second in duration applied in the first polarity with an applied voltage having an applied absolute magnitude of at least 0.1 volt and/or an applied current resulting in a voltage of absolute magnitude of at least 0.1 volt.

11. The system of claim 1, wherein the second portion of the predetermined pattern further comprises periodic micro-pulses applied in the second polarity interspersed with the micro-pulses applied in the first polarity.

12. The system of claim 1, wherein the applied voltage and/or current of the first portion of the predetermined pattern comprises micro-pulses applied to cause the panel to darken to the selected transmittance level.

13. The system of claim 1, wherein the plurality of micro-pulses of the third portion of the predetermined pattern comprises micro-pulses having an applied voltage with an applied absolute magnitude of at least 0.1 volt and/or an applied current which results in a voltage of at least 0.1 volt.

14. The system of claim 1, wherein the third portion of the predetermined pattern further comprises ceasing the micro-pulses before the panel lightens to the selected transmittance.

15. The system of claim 13, wherein the panel transitions from a darkened state to the selected transmittance level at least 10% faster than occurs by shorting leads of the panel to cause lightening.

16. A non-transitory computer-readable medium for directing delivery of electric current and/or voltage from a power supply to an electrochromic panel for controlling light transmittance of the panel, the medium comprising program instructions that, when executed by at least one controller in communication with the power supply, cause the at least one controller to:

generate and communicate a first signal to the power supply to cause the power supply to apply a voltage and/or current to the panel according to a first portion of a predetermined pattern to cause the panel to maintain a selected transmittance level; and upon receipt of an instruction to commence lightening of the panel, generate and communicate a second signal to the power supply to cause the power supply to apply a voltage and/or current to the panel for a predetermined period of time according to a second portion of the predetermined pattern to cause the panel to lighten, wherein the first and second portions of the predetermined pattern comprise a plurality of micro-pulses which are less than or equal to 0.5 second in duration.

17. The non-transitory computer-readable medium of claim 16, wherein an absolute magnitude of applied voltage of the micro-pulses is from 0.1 volt to 220 volts or an applied current resulting in a voltage of absolute magnitude of at least 0.1 volt.

18. A method for controlling transmittance of an electrochromic panel which is capable of lightening and darkening in response to an applied voltage and/or current, wherein the panel comprises at least one substrate, an electrically conductive coating on at least a portion of a surface of the at least one substrate forming at least one electrode, and an electrochromic medium covering portions of the at least one substrate and the at least one electrode and in electrical communication with the electrode, the method comprising:

applying a voltage and/or current to the at least one electrode according to a first predetermined pattern to cause the panel to maintain the selected transmittance level; and applying a voltage and/or current to the at least one electrode according to a second predetermined pattern to cause the panel to lighten, wherein the first predetermined pattern and the second predetermined pattern each comprise a plurality of micro-pulses which are less than or equal to 0.5 second in duration.

19. The system of claim 1, wherein the panel comprises an aircraft transparency.

20. The system of claim 19, wherein the aircraft transparency is configured to be mounted to a frame of an aircraft to form at an aircraft window.

* * * * *